United States Patent
Liu et al.

(10) Patent No.: US 12,532,294 B2
(45) Date of Patent: Jan. 20, 2026

(54) TRANSMISSION SCHEME AND DEVICE FOR SIDELINK IN NODES USED FOR WIRELESS COMMUNICATION

(71) Applicant: BUNKER HILL TECHNOLOGIES LLC, Allen, TX (US)

(72) Inventors: Jin Liu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 472 days.

(21) Appl. No.: 18/080,756

(22) Filed: Dec. 14, 2022

(65) Prior Publication Data

US 2023/0199721 A1    Jun. 22, 2023

(30) Foreign Application Priority Data

Dec. 16, 2021 (CN) .......................... 202111540698.2

(51) Int. Cl.
*H04W 72/02* (2009.01)
*H04W 72/0446* (2023.01)
*H04W 72/0453* (2023.01)

(52) U.S. Cl.
CPC ....... *H04W 72/02* (2013.01); *H04W 72/0446* (2013.01); *H04W 72/0453* (2013.01)

(58) Field of Classification Search
CPC ............. H04W 72/02; H04W 72/0446; H04W 72/0453; H04W 72/23; H04W 72/25; H04W 72/40; H04W 76/23; H04W 16/10
See application file for complete search history.

(56) References Cited

U.S. PATENT DOCUMENTS

| | | | | |
|---|---|---|---|---|
| 2018/0310303 A1* | 10/2018 | Wu | ................... | H04W 72/0446 |
| 2020/0029318 A1* | 1/2020 | Guo | ...................... | H04L 5/0055 |
| 2020/0344721 A1* | 10/2020 | Xing | ..................... | H04W 80/02 |
| 2021/0051673 A1* | 2/2021 | Chae | ..................... | H04W 72/23 |
| 2021/0105104 A1* | 4/2021 | Cao | ...................... | H04L 1/1861 |
| 2022/0015071 A1* | 1/2022 | Hui | ..................... | H04W 72/56 |
| 2022/0053515 A1* | 2/2022 | Zhang | .................. | H04W 72/21 |
| 2022/0191836 A1* | 6/2022 | Liu | ....................... | H04L 5/0053 |
| 2022/0264539 A1* | 8/2022 | Dong | .................. | H04W 72/56 |
| 2022/0369292 A1* | 11/2022 | Hui | ................... | H04W 72/0446 |
| 2022/0417910 A1* | 12/2022 | Lin | ................... | H04W 72/0453 |
| 2023/0199721 A1* | 6/2023 | Liu | ................... | H04W 72/0446 370/329 |

(Continued)

*Primary Examiner* — Benjamin H Elliott, IV
(74) *Attorney, Agent, or Firm* — Ascenda Law Group, PC

(57) ABSTRACT

The present application provides a method and device in nodes for wireless communications. A first node determines a target time-frequency resource group based on a target resource selection scheme in multiple resource pools, the target resource selection scheme is one of a first resource selection scheme or a second resource selection scheme, each of the multiple resource pools is a first-type resource pool, or each of the multiple resource pools is a second-type resource pool; transmits a first-type target signal on at least one time-frequency resource block in the target time-frequency resource group; the target resource selection scheme is related to whether each of the multiple resource pools is the first-type resource pool or each of the multiple resource pools is the second-type resource pool. The present application efficiently uses inter-user coordination resources to solve the problem of half-duplex and a hidden node.

18 Claims, 6 Drawing Sheets

(56) References Cited

U.S. PATENT DOCUMENTS

2023/0208567 A1\* 6/2023 Hu ..................... H04W 72/04
                                                    370/329
2023/0305099 A1\* 9/2023 Thomas ................ G01S 5/14

\* cited by examiner

TRANSMISSION SCHEME AND DEVICE FOR SIDELINK IN NODES USED FOR WIRELESS COMMUNICATION

CROSS REFERENCE TO RELATED APPLICATIONS

This application claims the priority benefit of Chinese Patent Application No. 202111540698.2, filed on Dec. 16, 2021, the full disclosure of which is incorporated herein by reference.

BACKGROUND

Technical Field

The present application relates transmission methods and devices in wireless communication systems, and in particular to a transmission scheme and device related to sidelink in wireless communications.

Related Art

Starting from Long Term Evolution (LTE), 3rd Generation Partner Project (3GPP) has been developing sidelink (SL) as a direct communication method between users, and has completed a first New Radio (NR) SL standard of "5G V2X with NR Sidelink" in Release-16 (Rel-16). In Rel-16, the NR SL is mainly designed for Vehicle-To-Everything (V2X), but it can also be used for Public Safety.

While due to time constraints, NR SL Rel-16 cannot fully support traffic requirements and working scenarios identified by 3GPP for 5G V2X. Therefore, NR SL is researched to be enhanced in Rel-17 in 3GPP.

SUMMARY

Since NR Rel-16 SL is a distributed system, a User Equipment (UE) independently selects resources, the problem of half-duplex (that is, the UE cannot transmit and receive at the same time) or a hidden UE can easily lead to that two transmitting users occupy same SL resources to transmit signals to a same receiving user, thus causing continuous interferences and resource collision between users. The introduction of inter-UE coordination is a feasible way to resolve inter-UE resource collisions, i.e., UE-A assists UE-B to perform channel sensing and provides the sensed available resources to the UE-B, and the UE-B then performs SL data transmission on available resources provided by the UE-A. In Inter-UE Coordination Scheme 1, the UE-A needs to provide the UE-B with preferred/non-preferred resource(s) sensed by the UE-A, and when the inter-UE coordination behavior is triggered by the scenario, the UE-A does not have sufficient prior information about that SL data that will be transmitted by the UE-B, thereby being difficult to provide the UE-B with available resources that match the SL data.

In response to the above problems, the present application discloses a resource selection method for multiple coordination messages, so as to effectively utilize inter-UE coordination resources, thus solving the problem of the half-duplex and a hidden node. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict. Though originally targeted at SL, the present application is also applicable to uplink (UL). Though originally targeted at single-carrier communications, the present application is also applicable to multicarrier communications. Though originally targeted at single-antenna communications, the present application is also applicable to multi-antenna communications. Besides, the present application is not only targeted at scenarios of V2X scenarios, but also at communication scenarios between terminals and base stations, terminals and relays as well as relays and base stations, where similar technical effect can be achieved. Additionally, the adoption of a unified solution for various scenarios, including but not limited to V2X scenarios and communication scenarios between terminals and base stations, contributes to the reduction of hardware complexity and costs.

It should be noted that interpretations of the terminology in the present application refer to definitions given in the 3GPP TS36 series, TS37 series, TS38 series, as well as definitions given in Institute of Electrical and Electronics Engineers (IEEE) protocol specifications.

The present application provides a method in a first node for wireless communications, comprising:

determining a target time-frequency resource group based on a target resource selection scheme in N resource pools, the target time-frequency resource group comprising at least one time-frequency resource block, N being a positive integer greater than 1, the target resource selection scheme being one of a first resource selection scheme or a second resource selection scheme, each of the N resource pools being a first-type resource pool, or, each of the N resource pools being a second-type resource pool; and transmitting a first-type target signal on at least one time-frequency resource block in the target time-frequency resource group;

wherein, each of the N resource pools comprises multiple time-frequency resource blocks; each time-frequency resource block in the target time-frequency resource group is a time-frequency resource block in the N resource pools; the target resource selection scheme is related to whether each of the N resource pools is the first-type resource pool or each of the N resource pools is the second-type resource pool; the first-type resource pool is pre-configured or is configured by a first-type signaling, and the second-type resource pool is configured by a second-type signaling; when each of the N resource pools is the first-type resource pool, the target resource selection scheme is the first resource selection scheme; when each of the N resource pools is the second-type resource pool, the target resource selection scheme is the second resource selection scheme; the first resource selection scheme comprises autonomously determining a first resource set from a first resource pool and selecting the target time-frequency resource group from the first resource set with equal probability, the first resource set belongs to the first resource pool, and the first resource pool is one of the N resource pools; the second resource selection scheme comprises selecting the target time-frequency resource group from a second resource set, the second resource set comprises at least a first resource subset, and the first resource subset is determined by a transmitter of the second-type signaling.

In one embodiment, a problem to be solved in the present application is: in Inter-UE Coordination Scheme 1, the UE-A needs to provide the UE-B with preferred/non-preferred resource(s) sensed by the UE-A, and when the inter-UE coordination behavior is triggered by the scenario, the UE-A does not have sufficient prior information about the SL data that will be transmitted by the UE-B, thereby being difficult to provide the UE-B with available resources that match the SL data.

In one embodiment, a problem to be solved in the present application is: the UE-A provides the UE-B with multiple available resource sets, and how does the UE-B select resources from multiple available resource sets.

In one embodiment, a problem to be solved in the present application is: how does the UE select resources to avoid the problems of half duplex (that is, users cannot transmit and receive at the same time) or a hidden UE.

In one embodiment, a method in the present application is establishing a relation between a target resource selection scheme and a resource pool type.

In one embodiment, a method in the present application is establishing a relation between a target resource selection scheme and a source of a resource pool.

In one embodiment, a method in the present application is establishing a relation between a target resource selection scheme and a type of a receiving signaling.

In one embodiment, advantages of the above method comprise that inter-UE coordination resources are effectively used to solve the problem of half duplex and a hidden node.

According to one aspect of the present application, the above method is characterized in comprising:
    receiving N second-type signalings, the N second-type signalings respectively indicating N resource sets, the N resource sets respectively belonging to the N resource pools;
    wherein, each of the N resource pools is the second-type resource pool, and the target resource selection scheme is the second resource selection scheme; the first resource subset comprises at least one of the N resource sets.

According to one aspect of the present application, the above method is characterized in that the target time-frequency resource group is selected from the second resource set with equal probability.

According to one aspect of the present application, the above method is characterized in that the first resource subset comprises X resource sets in the N resource sets, X being a positive integer greater than 1 and not greater than N; any of the X resource sets comprises at least one time-frequency resource block in the target time-frequency resource group.

In one embodiment, the above method is characterized in that a first resource selection window comprises time-domain resources occupied by the target time-frequency resource group; the first resource selection window is used to determine X.

According to one aspect of the present application, the above method is characterized in that the N second-type signalings comprise X second-type signalings, and the X second-type signalings are used to determine the X resource sets out of the N resource sets.

According to one aspect of the present application, the above method is characterized in that X second-type signalings in the N second-type signalings are used to indicate the X resource sets in the N resource sets; a measurement value for any of the X second-type signalings is not less than a measurement value of any second-type signaling other than the X second-type signalings in the N second-type signalings.

According to one aspect of the present application, the above method is characterized in that the N second-type signalings respectively indicate N first-type thresholds; the N first-type thresholds are respectively used by a transmitter of the N second-type signalings to generate the N resource sets; the N first-type thresholds comprise X first-type thresholds, the X first-type thresholds are respectively used by a transmitter of the N second-type signalings to generate the X resource sets; any of the X first-type thresholds is not greater than any first-type threshold other than the X first-type thresholds in the N first-type thresholds.

According to one aspect of the present application, the above method is characterized in that the first node is a UE.

According to one aspect of the present application, the above method is characterized in that the first node is a relay node.

According to one aspect of the present application, the above method is characterized in that the first node is a base station.

The present application provides a method in a second node for wireless communications, comprising:
    respectively executing monitorings on N time-frequency resource groups in N resource pools, N being a positive integer greater than 1; and
    respectively transmitting N second-type signalings in N resource pools, the N second-type signalings respectively indicating N resource sets, the N resource sets respectively belonging to the N resource pools;
    wherein, each of the N resource pools comprises multiple time-frequency resource blocks; the N time-frequency resource groups respectively belong to the N resource pools; each of the N time-frequency resource groups comprises multiple time-frequency resource blocks; the monitorings performed on the N time-frequency resource groups are respectively used by the second node to determine the N resource sets by itself.

According to one aspect of the present application, the above method is characterized in that the second node is a UE.

According to one aspect of the present application, the above method is characterized in comprising:
    receiving a first-type target signal on at least one time-frequency resource block in a target time-frequency resource group;
    wherein, any time-frequency resource block in the target time-frequency resource group is a time-frequency resource block in N resource sets; the N resource sets comprise X resource sets; any of the X resource sets comprises at least one time-frequency resource block in the target time-frequency resource group.

According to one aspect of the present application, the above method is characterized in that the N second-type signalings respectively indicate N first-type thresholds, and the N first-type thresholds are respectively used by the second node to determine the N resource sets.

According to one aspect of the present application, the above method is characterized in that the second node is a UE.

According to one aspect of the present application, the above method is characterized in that the second node is a relay node.

According to one aspect of the present application, the above method is characterized in that the second node is a base station.

The present application provides a first node for wireless communication, comprising:

a first receiver, determining a target time-frequency resource group based on a target resource selection scheme in N resource pools, the target time-frequency resource group comprising at least one time-frequency resource block, N being a positive integer greater than 1, the target resource selection scheme being one of a first resource selection scheme or a second resource selection scheme, each of the N resource pools being a first-type resource pool, or, each of the N resource pools being a second-type resource pool; and a first transmitter, transmitting a first-type target signal on at least one time-frequency resource block in the target time-frequency resource group;

wherein, each of the N resource pools comprises multiple time-frequency resource blocks; each time-frequency resource block in the target time-frequency resource group is a time-frequency resource block in the N resource pools; the target resource selection scheme is related to whether each of the N resource pools is the first-type resource pool or each of the N resource pools is the second-type resource pool; the first-type resource pool is pre-configured or is configured by a first-type signaling, and the second-type resource pool is configured by a second-type signaling; when each of the N resource pools is the first-type resource pool, the target resource selection scheme is the first resource selection scheme; when each of the N resource pools is the second-type resource pool, the target resource selection scheme is the second resource selection scheme; the first resource selection scheme comprises autonomously determining a first resource set from a first resource pool and selecting the target time-frequency resource group from the first resource set with equal probability, the first resource set belongs to the first resource pool, and the first resource pool is one of the N resource pools; the second resource selection scheme comprises selecting the target time-frequency resource group from a second resource set, the second resource set comprises at least a first resource subset, and the first resource subset is determined by a transmitter of the second-type signaling.

The present application provides a second node for wireless communications, comprising:

a second receiver, respectively executing monitorings on N time-frequency resource groups in N resource pools, N being a positive integer greater than 1; and a second transmitter, respectively transmitting N second-type signalings in N resource pools, the N second-type signalings respectively indicating N resource sets, the N resource sets respectively belonging to the N resource pools;

wherein, each of the N resource pools comprises multiple time-frequency resource blocks; the N time-frequency resource groups respectively belong to the N resource pools; each of the N time-frequency resource groups comprises multiple time-frequency resource blocks; the monitorings performed on the N time-frequency resource groups are respectively used by the second node to determine the N resource sets by itself.

In one embodiment, the present application is advantageous in the following aspects:

a problem to be solved in the present application is: the UE-A provides the UE-B with multiple available resource sets, and how does the UE-B select resources from multiple available resource sets.

a problem to be solved in the present application is: how does the UE select resources to avoid the problems of half duplex (that is, users cannot transmit and receive at the same time) or a hidden UE.

the present application establishes a relation between a target resource selection scheme and a type of a resource pool.

the present application establishes a relation between a target resource selection scheme and a source of a resource pool.

the present application establishes a relation between a target resource selection scheme and a type of a receiving signaling.

the present application effectively uses inter-UE coordination resources to solve the problem of half duplex and a hidden node.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
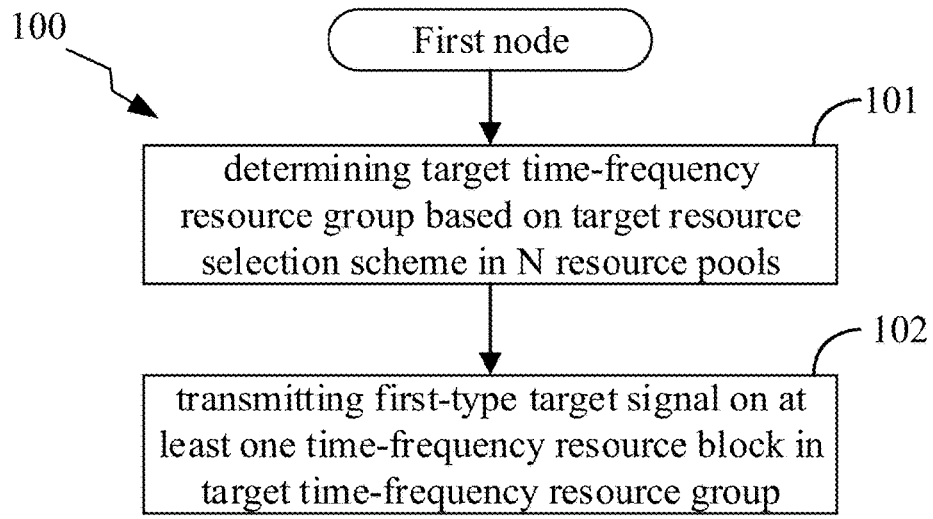
FIG. 1 illustrates a flowchart of the processing of a first node according to one embodiment of the present application.

Embodiment 1 illustrates a flowchart of the processing of a first node according to one embodiment of the present application, as shown in FIG. 1. In FIG. 1, each block represents a step.

In embodiment 1, a first node in the present application first executes step 101 to determine a target time-frequency resource group based on a target resource selection scheme in N resource pools, N being a positive integer greater than 1; then executes step 102, transmits a first-type target signal on at least one time-frequency resource block in the target time-frequency resource group; each of the N resource pools comprises multiple time-frequency resource blocks; the target time-frequency resource group comprises at least one time-frequency resource block; each time-frequency resource block in the target time-frequency resource group is a time-frequency resource block in the N resource pools; the target resource selection scheme is one of a first resource selection scheme or a second resource selection scheme; each of the N resource pools is a first-type resource pool, or each of the N resource pools is a second-type resource pool; the target resource selection scheme is related to whether each of the N resource pools is the first-type resource pool or each of the N resource pools is the second-type resource pool; the first-type resource pool is pre-configured or is configured by a first-type signaling, and the second-type resource pool is configured by a second-type signaling; when each of the N resource pools is the first-type resource pool, the target resource selection scheme is the first resource selection scheme; when each of the N resource pools is the second-type resource pool, the target resource selection scheme is the second resource selection scheme; the first resource selection scheme comprises autonomously determining a first resource set from a first resource pool and selecting the target time-frequency resource group from the first resource set with equal probability, the first resource set belongs to the first resource pool, and the first resource pool is one of the N resource pools; the second resource selection scheme comprises selecting the target time-frequency resource group from a second resource set, the second resource set comprises at least a first resource subset, and the first resource subset is determined by a transmitter of the second-type signaling.

In one embodiment, any of the N resource pools comprises all or partial resources in a sidelink resource pool, N being a positive integer greater than 1.

In one embodiment, any of the N resource pools comprises multiple time-frequency resource blocks, N being a positive integer greater than 1.

In one embodiment, at least one of the multiple time-frequency resource blocks comprised in any of the N resource pools comprises a Physical Sidelink Control Channel (PSCCH), N being a positive integer greater than 1.

In one embodiment, at least one of the multiple time-frequency resource blocks comprised in any of the N resource pools comprises a Physical Sidelink Shared Channel (PSSCH), N being a positive integer greater than 1.

In one embodiment, at least one of the multiple time-frequency resource blocks comprised in any of the N resource pools comprises a Physical Sidelink Feedback Channel (PSFCH), N being a positive integer greater than 1.

In one embodiment, at least one of the multiple time-frequency resource blocks comprised in any of the N resource pools comprises a PSCCH and a PSSCH, N being a positive integer greater than 1.

In one embodiment, any of the multiple time-frequency resource blocks comprised in any of the N resource pools occupies multiple REs, N being a positive integer greater than 1.

In one embodiment, any of the multiple time-frequency resource blocks comprised in any of the N resource pools comprises a positive integer number of multicarrier symbol(s) in time domain, N being a positive integer greater than 1.

In one embodiment, any of the multiple time-frequency resource blocks comprised in any of the N resource pools comprises a positive integer number of slot(s) in time domain, N being a positive integer greater than 1.

In one embodiment, any of the multiple time-frequency resource blocks comprised in any of the N resource pools comprises a positive integer number of subcarrier(s) in frequency domain, N being a positive integer greater than 1.

In one embodiment, any of the multiple time-frequency resource blocks comprised in any of the N resource pools comprises a positive integer number of Physical Resource Block(s) (PRB(s)) in frequency domain, N being a positive integer greater than 1.

In one embodiment, any of the multiple time-frequency resource blocks comprised in any of the N resource pools comprises a positive integer number of sub-channel(s) in frequency domain, N being a positive integer greater than 1.

In one embodiment, each of the N resource pools is one of a first-type resource pool or a second-type resource pool.

In one embodiment, each of the N resource pools is a first-type resource pool, or each of the N resource pools is a second-type resource pool.

In one embodiment, all of the N resource pools is one of a first-type resource pool or a second-type resource pool.

In one embodiment, all of the N resource pools are first-type resource pools, or, all of the N resource pools are second-type resource pools.

In one embodiment, at least two of the N resource pools are Frequency Domain Multiplexing (FDM).

In one embodiment, at least two of the N resource pools are Time Domain Multiplexing (TDM).

In one embodiment, any two of the N resource pools are FDM.

In one embodiment, any two of the N resource pools are TDM.

In one embodiment, at least two of the N resource pools are orthogonal.

In one embodiment, at least two of the N resource pools are orthogonal in time domain.

In one embodiment, at least two of the N resource pools are orthogonal in frequency domain.

In one embodiment, any two of the N resource pools are orthogonal.

In one embodiment, any two of the N resource pools are orthogonal in time domain.

In one embodiment, any two of the N resource pools are orthogonal in frequency domain.

In one embodiment, a first resource pool is any of the N resource pools, and the first resource pool comprises multiple time-frequency resource blocks, N being a positive integer greater than 1.

In one embodiment, any of the multiple time-frequency resource blocks comprised in the first resource pool comprises a positive integer number of multicarrier symbol(s) in time domain, and any of the multiple time-frequency resource block(s) comprised in the first resource pool comprises a positive integer number of PRB(s) in frequency domain.

In one embodiment, any of the multiple time-frequency resource blocks comprised in the first resource pool comprises a positive integer number of slot(s) in time domain, and any of the multiple time-frequency resource blocks comprised in the first resource pool comprises a positive integer number of PRB(s) in frequency domain.

In one embodiment, any of the multiple time-frequency resource blocks comprised in the first resource pool comprises a positive integer number of slot(s) in time domain, and any of the multiple time-frequency resource blocks comprised in the first resource pool comprises a positive integer number of sub-channel(s) in frequency domain.

In one embodiment, any of the N resource pools comprises multiple time-domain resource blocks in time domain.

In one embodiment, the first resource pool comprises multiple time-domain resource blocks in time domain.

In one embodiment, time-domain resources occupied by any of the multiple time-frequency resource blocks comprised in the first resource pool are one of the multiple time-domain resource blocks comprised in the first resource pool in time domain.

In one embodiment, any of the multiple time-domain resource blocks comprised in the first resource pool in time domain comprises a positive integer number of symbol(s).

In one embodiment, any of the multiple time-domain resource blocks comprised in the first resource pool in time domain comprises a positive integer number of slot(s).

In one embodiment, the first resource pool comprises at least one frequency-domain resource block in frequency domain.

In one embodiment, the first resource pool comprises multiple frequency-domain resource blocks in frequency domain.

In one embodiment, the first resource pool comprises multiple time-domain resource blocks in time domain, and the first resource pool comprises at least one frequency-domain resource block in frequency domain.

In one embodiment, frequency-domain resources occupied by any of the multiple time-frequency resource blocks comprised in the first resource pool are one of the at least one frequency-domain resource block comprised in the first resource pool in frequency domain.

In one embodiment, any of the at least one frequency-domain resource block comprised in the first resource pool comprises a positive integer number of subcarrier(s).

In one embodiment, any of the at least one frequency-domain resource block comprised in the first resource pool comprises a positive integer number of PRB(s).

In one embodiment, any of the at least one frequency-domain resource block comprised in the first resource pool comprises a positive integer number of sub-channel(s).

In one embodiment, the first-type resource pool is a sidelink resource pool.

In one embodiment, the first-type resource pool is pre-configured.

In one embodiment, the first-type resource pool is configured by a base station.

In one embodiment, the first-type resource pool is pre-configured or configured by a base station.

In one embodiment, the first-type resource pool is cell-specific.

In one embodiment, the first-type resource pool is cell-specific or UE-specific.

In one embodiment, the first-type resource pool is provided by a base station.

In one embodiment, the first-type resource pool is provided by a higher layer of the first node.

In one embodiment, the first-type resource pool is provided by a base station or a higher layer of the first node.

In one embodiment, the first-type resource pool is configured by a first-type signaling.

In one embodiment, the first-type resource pool is indicated by a first-type signaling.

In one embodiment, the first-type signaling is transmitted by a base station.

In one embodiment, the first-type signaling is transmitted by a higher layer of the first node.

In one embodiment, the first-type signaling is transmitted by a base station or a higher layer of the first node.

In one embodiment, the higher layer of the first node comprises a Radio Resource Control (RRC) layer.

In one embodiment, the higher layer of the first node comprises a Multimedia Access Control (MAC) layer.

In one embodiment, the first-type signaling comprises a Downlink (DL) signaling.

In one embodiment, the first-type signaling is equivalent to a downlink signaling.

In one embodiment, the first-type signaling and a downlink signaling can be used interchangeably.

In one embodiment, the first-type signaling is transmitted on a downlink.

In one embodiment, the first-type signaling is not transmitted in the first-type resource pool.

In one embodiment, the first-type signaling comprises a higher-layer signaling.

In one embodiment, the first-type signaling comprises a System Information Block (SIB).

In one embodiment, the first-type signaling comprises an SIB12.

In one embodiment, the first-type signaling comprises one or multiple RRC signalings.

In one embodiment, the first-type signaling comprises one or multiple MAC signalings.

In one embodiment, the first-type signaling comprises one or multiple RRC Information Elements (IEs).

In one embodiment, the first-type signaling comprises one or multiple RRC IEs in a pre-configured signaling.

In one embodiment, the first-type signaling comprises one or multiple RRC IEs in a downlink signaling.

In one embodiment, the first-type signaling comprises SL-PreconfigurationNR.

In one embodiment, the first-type signaling comprises an SL-ResourcePool.

In one embodiment, the first-type signaling comprises at least one of SIB12, SL-PreconfigurationNR, SL-ConfigCommon, SL-FreqConfigCommon, SL-FreqConfig, SL-BWP-ConfigCommon, SL-BWP-Config, SL-BWP-PoolConfig, SL-BWP-PoolConfigCommon, SL-ResourcePoolConfig or SL-ResourcePool.

In one embodiment, for the definition of the SIB12, refer to section 6.3.1 in 3GPP TS38.331.

In one embodiment, for the definition of SL-PreconfigurationNR, refer to section 9.3 in 3GPP TS38.331.

In one embodiment, for the definition of any IE in SL-ConfigCommon, SL-FreqConfigCommon, SL-FreqConfig, SL-BWP-ConfigCommon, SL-BWP-Config, SL-BWP-PoolConfig, SL-BWP-PoolConfigCommon, SL-ResourcePoolConfig and SL-ResourcePool, refer to section 6.3.5 in 3GPP TS38.331.

In one embodiment, the first-type signaling configures an Identity (ID) of the first-type resource pool.

In one embodiment, the first-type signaling configures time-domain resources occupied by the first-type resource pool.

In one embodiment, the first-type signaling configures frequency-domain resources occupied by the first-type resource pool.

In one embodiment, the first-type signaling configures a number of sub-channel(s) in the first-type resource pool.

In one embodiment, the first-type signaling configures a number of PRB(s) in the first-type resource pool.

In one embodiment, the first-type signaling indicates a lowest RB index in a sub-channel carrying a lowest index in the first-type resource pool.

In one embodiment, the first-type signaling indicates Time-Division Duplex (TDD) configuration of the first-type resource pool.

In one embodiment, the first-type signaling indicates an extra Modulation and Coding Scheme (MCS) list adopted in the first-type resource pool.

In one embodiment, the first-type signaling indicates a bitmap of the first-type resource pool.

In one embodiment, the first-type signaling indicates a size of a time window of a Channel Busy Ratio (CBR) measurement for the first-type resource pool.

In one embodiment, the first-type signaling indicates a priority threshold list of the first-type resource pool.

In one embodiment, the first-type signaling indicates a PSCCH configuration in the first-type resource pool.

In one embodiment, the first-type signaling indicates a PSSCH configuration in the first-type resource pool.

In one embodiment, the first-type signaling indicates a PSFCH configuration in the first-type resource pool.

In one embodiment, the second-type resource pool is a sidelink resource pool.

In one embodiment, the second-type resource pool is configured by a communication node other than the first node.

In one embodiment, the second-type resource pool is configured by the second node.

In one embodiment, the second-type resource pool is configured by a UE other than the first node.

In one embodiment, the second-type resource pool is configured by a relay node.

In one embodiment, the first-type resource pool is UE-specific.

In one embodiment, the second-type resource pool is provided by the second node.

In one embodiment, the second-type resource pool is provided by a transmitter of the second-type signaling.

In one embodiment, the second-type resource pool is determined by a transmitter of the second-type signaling.

In one embodiment, the second-type resource pool is configured by the second-type signaling.

In one embodiment, the second-type resource pool is indicated by the second-type signaling.

In one embodiment, the second-type signaling is transmitted by the second node.

In one embodiment, the transmitter of the second-type signaling is the second node.

In one embodiment, the second-type resource pool is indicated by the second node through transmitting the second-type signaling.

In one embodiment, the second-type resource pool is indicated by the second node through transmitting the second-type signaling in the second-type resource pool.

In one embodiment, the second-type resource pool is implicitly indicated by the second node through transmitting the second-type signaling in the second-type resource pool.

In one embodiment, the second node is a UE.

In one embodiment, the second node is a relay node.

In one embodiment, the second-type resource pool is indicated through transmitting the second-type signaling in the second-type resource pool.

In one embodiment, the second-type resource pool is implicitly indicated through transmitting the second-type signaling in the second-type resource pool.

In one embodiment, the second-type signaling comprises a sidelink signaling.

In one embodiment, the second-type signaling is equivalent to an SL signaling.

In one embodiment, the second-type and an SL signaling can be used interchangeably.

In one embodiment, the second-type signaling is transmitted on an SL.

In one embodiment, the second-type signaling comprises a higher-layer signaling.

In one embodiment, the second-type signaling comprises one or multiple RRC signalings.

In one embodiment, the second-type signaling comprises one or multiple MAC signalings.

In one embodiment, the second-type signaling comprises one or multiple RRC IEs.

In one embodiment, the second-type signaling comprises one or multiple RRC IEs in an SL signaling.

In one embodiment, the second-type signaling indicates an ID of the second-type resource pool.

In one embodiment, the second-type signaling indicates time-domain resources occupied by the second-type resource pool.

In one embodiment, the second-type signaling indicates frequency-domain resources occupied by the second-type resource pool.

In one embodiment, the second-type signaling is transmitted in the second-type resource pool.

In one embodiment, the first-type signaling is transmitted on DL, and the second-type signaling is transmitted on SL.

In one embodiment, the first-type signaling is transmitted on DL, and the second-type signaling is transmitted in the second-type resource pool.

In one embodiment, the first-type signaling is not transmitted in the first-type resource pool, and the second-type signaling is transmitted in the second-type resource pool.

In one embodiment, the first-type signaling is transmitted by a higher layer of the first node to a physical layer of the first node, and the second-type signaling is transmitted by the second node to the first node.

In one embodiment, the first-type is transmitted by a communication node other than the second node to the first node, and the second-type signaling is transmitted by the second node to the first node.

In one embodiment, the communication node other than the second node is a base station.

In one embodiment, the communication node other than the second node is a relay node.

In one embodiment, the first-type is transmitted by a base station to the first node, and the second-type signaling is transmitted by the second node to the first node.

In one embodiment, the first-type is transmitted by a base station to the first node, and the second-type signaling is transmitted by a UE to the first node.

In one embodiment, the first-type is transmitted by a base station to the first node, and the second-type signaling is transmitted by a relay node to the first node.

In one embodiment, the first-type signaling explicitly indicates the first-type resource pool, and the second-type signaling implicitly indicates the second-type resource pool.

In one embodiment, the N resource pools comprise the target time-frequency resource group.

In one embodiment, the target time-frequency resource group belongs to the N resource pools.

In one embodiment, the target time-frequency resource group belongs to at least one of the N resource pools.

In one embodiment, the target time-frequency resource group belongs to one of the N resource pools.

In one embodiment, the target time-frequency resource group belongs to at least two of the N resource pools.

In one embodiment, the target time-frequency resource group comprises at least one time-frequency resource block, and the at least one time-frequency resource block comprised in the target time-frequency resource group belongs to the N resource pools.

In one embodiment, the target time-frequency resource group comprises at least one time-frequency resource block, and each time-frequency resource block in the target time-frequency resource group is one of the N resource pools.

In one embodiment, the target time-frequency resource group comprises multiple time-frequency resource blocks, and each time-frequency resource block in the target time-frequency resource group is a time-frequency resource block in a same resource pool in the N resource pools.

In one embodiment, the target time-frequency resource group comprises multiple time-frequency resource blocks, and the multiple time-frequency resource blocks comprised in the target time-frequency resource group belong to a same one of the N resource pools.

In one embodiment, the target time-frequency resource group comprises multiple time-frequency resource blocks, and the multiple time-frequency resource blocks comprised in the target time-frequency resource group are respectively multiple time-frequency resource blocks in a same one of the N resource pools.

In one embodiment, the target time-frequency resource group comprises multiple time-frequency resource blocks, and the multiple time-frequency resource blocks comprised in the target time-frequency resource group belong to at least two of the N resource pools.

In one embodiment, the target time-frequency resource group comprises multiple time-frequency resource blocks, a first target time-frequency resource block and a second target time-frequency resource block are two of the multiple time-frequency resource blocks comprised in the target time-frequency resource group, the first target time-frequency resource block is a time-frequency resource block in a first candidate resource pool, the second target time-frequency resource block is a time-frequency resource block in a second candidate resource pool, and the first candidate resource pool and the second candidate resource pool are respectively two of the N resource pools.

In one embodiment, at least two time-frequency resource blocks in the target time-frequency resource group are FDM.

In one embodiment, at least two time-frequency resource blocks in the target time-frequency resource group are TDM.

In one embodiment, any two time-frequency resource blocks in the target time-frequency resource group are FDM.

In one embodiment, any two time-frequency resource blocks in the target time-frequency resource group are TDM.

In one embodiment, at least two time-frequency resource blocks in the target time-frequency resource group are orthogonal.

In one embodiment, at least two time-frequency resource blocks in the target time-frequency resource group are orthogonal in time domain.

In one embodiment, at least two time-frequency resource blocks in the target time-frequency resource group are orthogonal in frequency domain.

In one embodiment, any two time-frequency resource blocks in the target time-frequency resource group are orthogonal.

In one embodiment, any two time-frequency resource blocks in the target time-frequency resource group are orthogonal in time domain.

In one embodiment, any two time-frequency resource blocks in the target time-frequency resource group are orthogonal in frequency domain.

In one embodiment, each time-frequency resource block in the target time-frequency resource group comprises a PSCCH.

In one embodiment, each time-frequency resource block in the target time-frequency resource group comprises a PSSCH.

In one embodiment, each time-frequency resource block in the target time-frequency resource group comprises a PSCCH and a PSSCH.

In one embodiment, each time-frequency resource block in the target time-frequency resource group is reserved for the first-type target signal.

In one embodiment, each time-frequency resource block in the target time-frequency resource group is reserved for an SL transmission.

In one embodiment, the first-type target signal comprises a baseband signal.

In one embodiment, the first-type target signal comprises a radio frequency signal.

In one embodiment, the first-type target signal comprises a radio signal.

In one embodiment, the first-type target signal comprises a packet.

In one embodiment, the first-type target signal comprises SL data.

In one embodiment, the first-type target signal comprises available data in one or multiple logical channels.

In one embodiment, the first-type target signal comprises available SL data in one or multiple logical channels.

In one embodiment, the first-type target signal comprises one or multiple MAC PDUs.

In one embodiment, the first-type target signal comprises one or multiple MAC SDUs.

In one embodiment, the first-type target signal comprises a Transport Block (TB).

In one embodiment, the first-type target signal comprises multiple TBs.

In one embodiment, the first-type target signal is transmitted on a PSCCH.

In one embodiment, the first-type target signal is transmitted on a PSSCH.

In one embodiment, the first-type target signal is transmitted on a PSCCH and a PSSCH.

In one embodiment, the first-type signaling comprises all or part of a higher-layer signaling.

In one embodiment, the first-type target signal comprises a first bit block, and the first bit block comprises at least one bit.

In one embodiment, a first bit block is used to generate the first-type target signal, and the first bit block comprises at least one bit.

In one embodiment, the first bit block comes from a Sidelink Shared Channel (SL-SCH).

In one embodiment, the first bit block comprises one TB.

In one embodiment, the first bit block comprises a MAC PDU.

In one embodiment, the first-type target signal is obtained after all or partial bits of the first bit block sequentially through transport block-level Cyclic Redundancy Check (CRC) attachment, Code Block Segmentation, code block-level CRC attachment, Channel Coding, Rate Matching, Code Block Concatenation, Scrambling, Modulation, Layer Mapping, Antenna Port Mapping, Mapping to Physical Resource Blocks, Baseband Signal Generation and Modulation and Upconversion.

In one embodiment, the first-type target signal is an output after the first bit block is sequentially subjected to a modulation mapper, a layer mapper, precoding, a resource element mapper, and multi-carrier symbol generation.

In one embodiment, the channel coding is based on a polar code.

In one embodiment, the channel coding is based on a Low-density Parity-Check (LDPC) code.

In one embodiment, the first-type target signal comprises a first sub-signaling.

In one embodiment, the first-type target signal comprises a first sub-signaling and the first bit block.

In one embodiment, the first sub-signaling in the first-type target signal is transmitted on a PSCCH.

In one embodiment, the first sub-signaling in the first-type target signal is transmitted on a PSCCH, and the first bit block in the first-type target signal is transmitted on a PSSCH.

In one embodiment, the first sub-signaling in the first-type target signal is Sidelink Control Information (SCI).

In one embodiment, the first sub-signaling in the first-type target signal is SCI format 1-A.

In one embodiment, the first sub-signaling in the first-type target signal is SCI format 2-A.

In one embodiment, the first sub-signaling in the first-type target signal is SCI format 2-B.

In one embodiment, the first-type target signal is transmitted on the at least one time-frequency resource block in the target time-frequency resource group.

In one embodiment, the first-type target signal is transmitted on a time-frequency resource block in the target time-frequency resource group.

In one embodiment, the first-type target signal is transmitted on multiple time-frequency resource blocks in the target time-frequency resource group.

In one embodiment, the first-type target signal is transmitted on each time-frequency resource block in the target time-frequency resource group.

In one embodiment, multiple first-type target signals are respectively transmitted on multiple time-frequency resource blocks in the target time-frequency resource group.

In one embodiment, the multicarrier symbol in the present application is a Single-Carrier Frequency-Division Multiple Access (SC-FDMA) symbol.

In one embodiment, the multicarrier symbol in the present application is a Discrete Fourier Transform Spread Orthogonal Frequency Division Multiplexing (DFT-S-OFDM) symbol.

In one embodiment, the multicarrier symbol in the present application is a Frequency Division Multiple Access (FDMA) symbol.

In one embodiment, the multi-carrier symbol in the present application is a Filter Bank Multi-Carrier (FBMC) symbol.

In one embodiment, the multicarrier symbol in the present application is an Interleaved Frequency Division Multiple Access (IFDMA) symbol.

Embodiment 2

Figure 2:
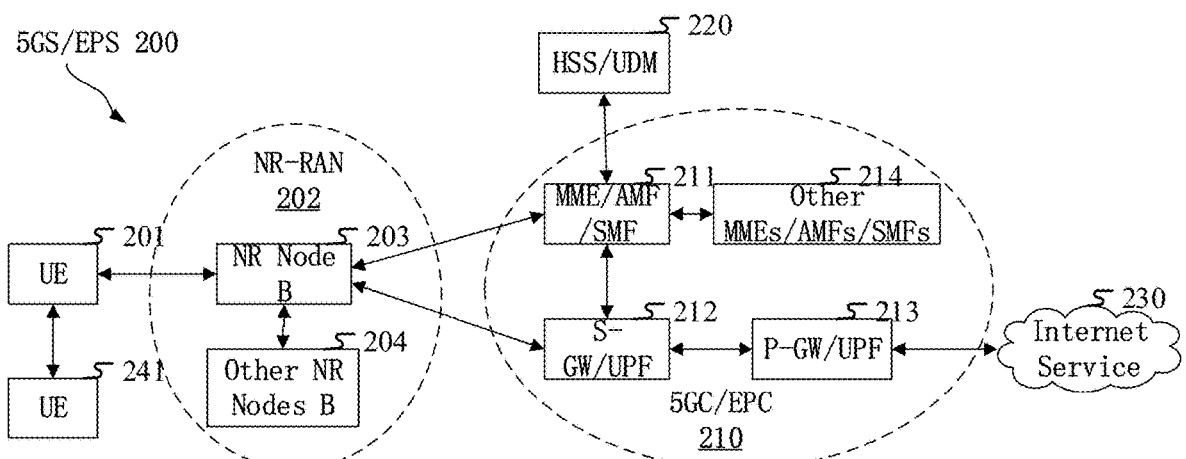
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN networks, examples of gNB 203 include satellites, aircrafts, or ground base stations relayed through satellites. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/ UPF 213. The MME/AMF/SMF 211 is a control node for processing a signaling between the UE 201 and the 5GC/ EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application comprises the UE 201.

In one embodiment, the second node in the present application comprises the UE 241.

In one embodiment, the UE in the present application comprises the UE 201.

In one embodiment, the UE in the present application comprises the UE 241.

In one embodiment, a transmitter of N second-type signalings in the present application comprises the UE 241.

In one embodiment, a receiver of N second-type signalings in the present application comprises the UE 201.

In one embodiment, a transmitter of a first-type target signal in the present application comprises the UE 201.

In one embodiment, a receiver of a first-type target signal in the present application comprises the UE 241.

Embodiment 3

Figure 3:
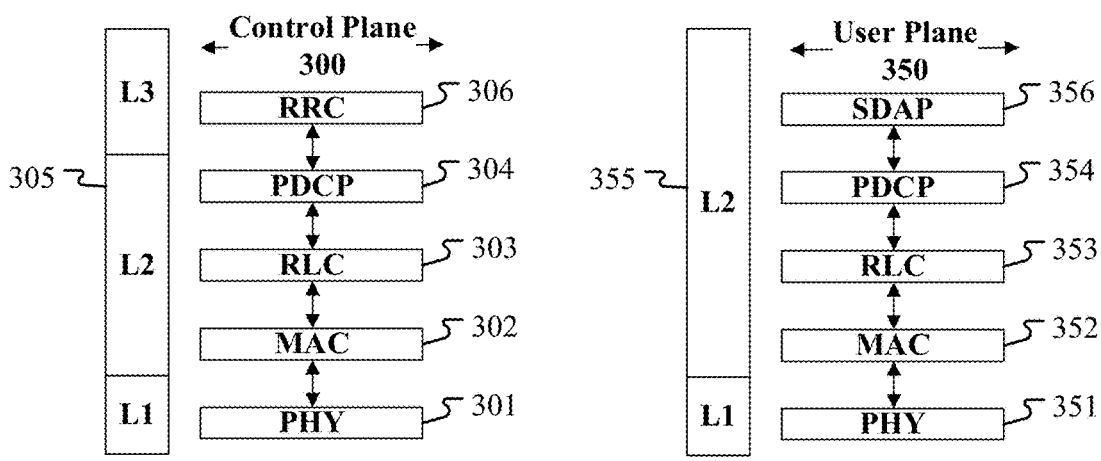
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are respectively layer 1, layer 2 and layer 3. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel The MAC sublayer 302 is also responsible for allocating between first nodes various radio resources (i.e., resource block) in a cell. The MAC sublayer 302 is also responsible for HARQ operations. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the N second-type signalings in the present application are generated by the RRC sublayer 306.

In one embodiment, the N second-type signalings in the present application are transmitted to the PHY 301 via the MAC sublayer 302.

In one embodiment, the first-type target signal in the present application is generated by the MAC sublayer 302.

In one embodiment, the first-type target signal in the present application is generated by the RRC sublayer 306.

In one embodiment, the first-type target signal in the present application is transmitted to the PHY 301 via the MAC sublayer 302.

Embodiment 4

Figure 4:
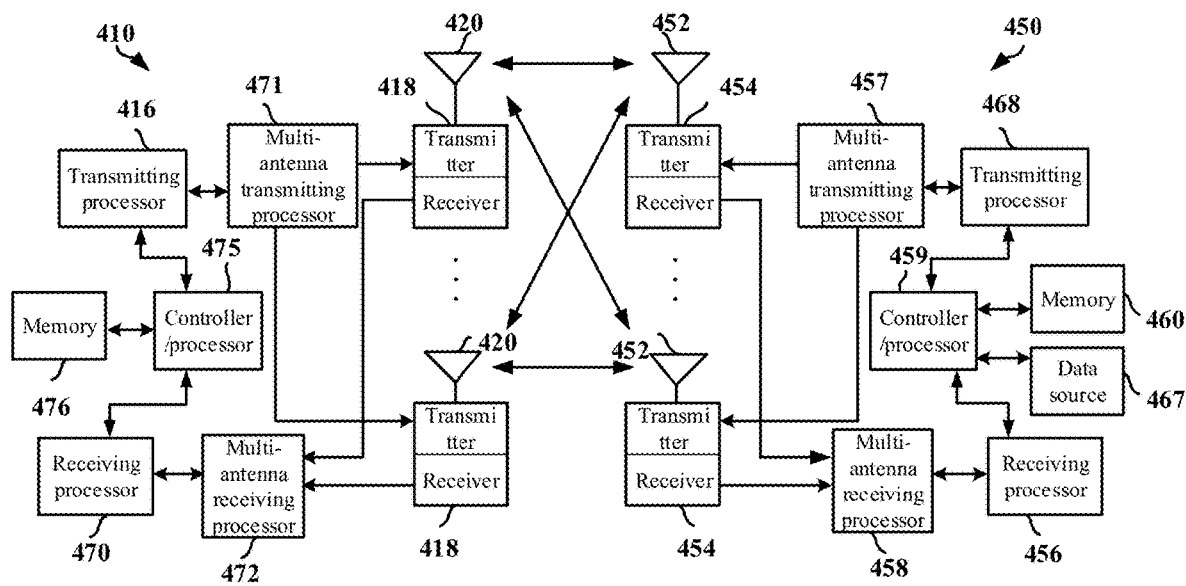
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a relay node, and the second node is a relay node.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: determines a target time-frequency resource group based on a target resource selection scheme in N resource pools, the target time-frequency resource group comprises at least one time-frequency resource block, N being a positive integer greater than 1, the target resource selection scheme is one of a first resource selection scheme or a second resource selection scheme, each of the N resource pools is a first-type resource pool, or, each of the N resource pools is a second-type resource pool; and transmits a first-type target signal on at least one time-frequency resource block in the target time-frequency resource group; each of the N resource pools comprises multiple time-frequency resource blocks; each time-frequency resource block in the target time-frequency resource group is a time-frequency resource block in the N resource pools; the target resource selection scheme is related to whether each of the N resource pools is the first-type resource pool or each of the N resource pools is the second-type resource pool; the first-type resource pool is pre-configured or is configured by a first-type signaling, and the second-type resource pool is configured by a second-type signaling; when each of the N resource pools is the first-type resource pool, the target resource selection scheme is the first resource selection scheme; when each of the N resource pools is the second-type resource pool, the target resource selection scheme is the second resource selection scheme; the first resource selection scheme comprises autonomously determining a first resource set from a first resource pool and selecting the target time-frequency resource group from the first resource set with equal probability, the first resource set belongs to the first resource pool, and the first resource pool is one of the N resource pools; the second resource selection scheme comprises selecting the target time-frequency resource group from a second resource set, the second resource set comprises at least a first resource subset, and the first resource subset is determined by a transmitter of the second-type signaling.

In one embodiment, the second communication device 450 comprises a memory that stores a computer readable instruction program. The computer readable instruction program generates an action when executed by at least one processor. The action includes: determining a target time-frequency resource group based on a target resource selection scheme in N resource pools, the target time-frequency resource group comprising at least one time-frequency resource block, N being a positive integer greater than 1, the target resource selection scheme being one of a first resource selection scheme or a second resource selection scheme, each of the N resource pools being a first-type resource pool, or, each of the N resource pools being a second-type resource pool; and transmitting a first-type target signal on at least one time-frequency resource block in the target time-frequency resource group; each of the N resource pools comprises multiple time-frequency resource blocks; each time-frequency resource block in the target time-frequency resource group is a time-frequency resource block in the N resource pools; the target resource selection scheme is related to whether each of the N resource pools is the first-type resource pool or each of the N resource pools is the second-type resource pool; the first-type resource pool is pre-configured or is configured by a first-type signaling, and the second-type resource pool is configured by a second-type signaling; when each of the N resource pools is the first-type resource pool, the target resource selection scheme is the first resource selection scheme; when each of the N resource pools is the second-type resource pool, the target resource selection scheme is the second resource selection scheme; the first resource selection scheme comprises autonomously determining a first resource set from a first resource pool and selecting the target time-frequency resource group from the first resource set with equal probability, the first resource set belongs to the first resource pool, and the first resource pool is one of the N resource pools; the second resource selection scheme comprises selecting the target time-frequency resource group from a second resource set, the second resource set comprises at least a first resource subset, and the first resource subset is determined by a transmitter of the second-type signaling.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: respectively executes monitoring on N time-frequency resource groups in N resource pools, N being a positive integer greater than 1; respectively transmits N second-type signalings in N resource pools, the N second-type signalings respectively indicate N resource sets, the N resource sets respectively belong to the N resource pools; each of the N resource pools comprises multiple time-frequency resource blocks; the N time-frequency resource groups respectively belong to the N resource pools; each of the N time-frequency resource groups comprises multiple time-frequency resource blocks; the monitorings performed on the N time-frequency resource groups are respectively used by the second node to determine the N resource sets by itself.

In one embodiment, the first communication device 410 comprises a memory that stores a computer readable instruction program. The computer readable instruction program generates an action when executed by at least one processor. The action includes: respectively executing monitorings on N time-frequency resource groups in N resource pools, N being a positive integer greater than 1; respectively transmitting N second-type signalings in N resource pools, the N second-type signalings respectively indicating N resource sets, the N resource sets respectively belonging to the N resource pools; each of the N resource pools comprises multiple time-frequency resource blocks; the N time-frequency resource groups respectively belong to the N resource pools; each of the N time-frequency resource groups comprises multiple time-frequency resource blocks; the monitorings performed on the N time-frequency resource groups are respectively used by the second node to determine the N resource sets by itself.

In one embodiment, at least one of the antenna 452, the receiver 454, the multi-antenna receiving processor 458, the receiving processor 456, the controller/processor 459, the memory 460, or the data source 467 is used to determine a target time-frequency resource group based on a target resource selection scheme in N resource pools.

In one embodiment, at least one of the transmitting processor 468, the controller/processor 459, the memory 460, or the data source 467 is used to transmit a first-type signal on at least one time-frequency resource block in a target time-frequency resource group in the present application.

In one embodiment, at least one of the antenna 452, the receiver 454, the multi-antenna receiving processor 458, the receiving processor 456, the controller/processor 459, the memory 460, or the data source 467 is used to receive N second-type signalings in the present application.

In one embodiment, at least one of the antenna 420, the receiver 418, the multi-antenna receiving processor 472, the receiving processor 470, the controller/processor 475, or the memory 476 is used to respectively execute monitoring on N time-frequency resource groups in N resource pools in the present application.

In one embodiment, at least one of the antenna 420, the transmitter 418, the multi-antenna transmitting processor 471, the transmitting processor 416, the controller/processor 475, or the memory 476 is used to respectively transmit N second-type signalings in N resource pools in the present application.

In one embodiment, at least one of the antenna 420, the receiver 418, the multi-antenna receiving processor 472, the receiving processor 470, the controller/processor 475, or the memory 476 is used to receive a first-type target signal on at least one time-frequency resource block in a target time-frequency resource group in the present application.

Embodiment 5

Figure 5:
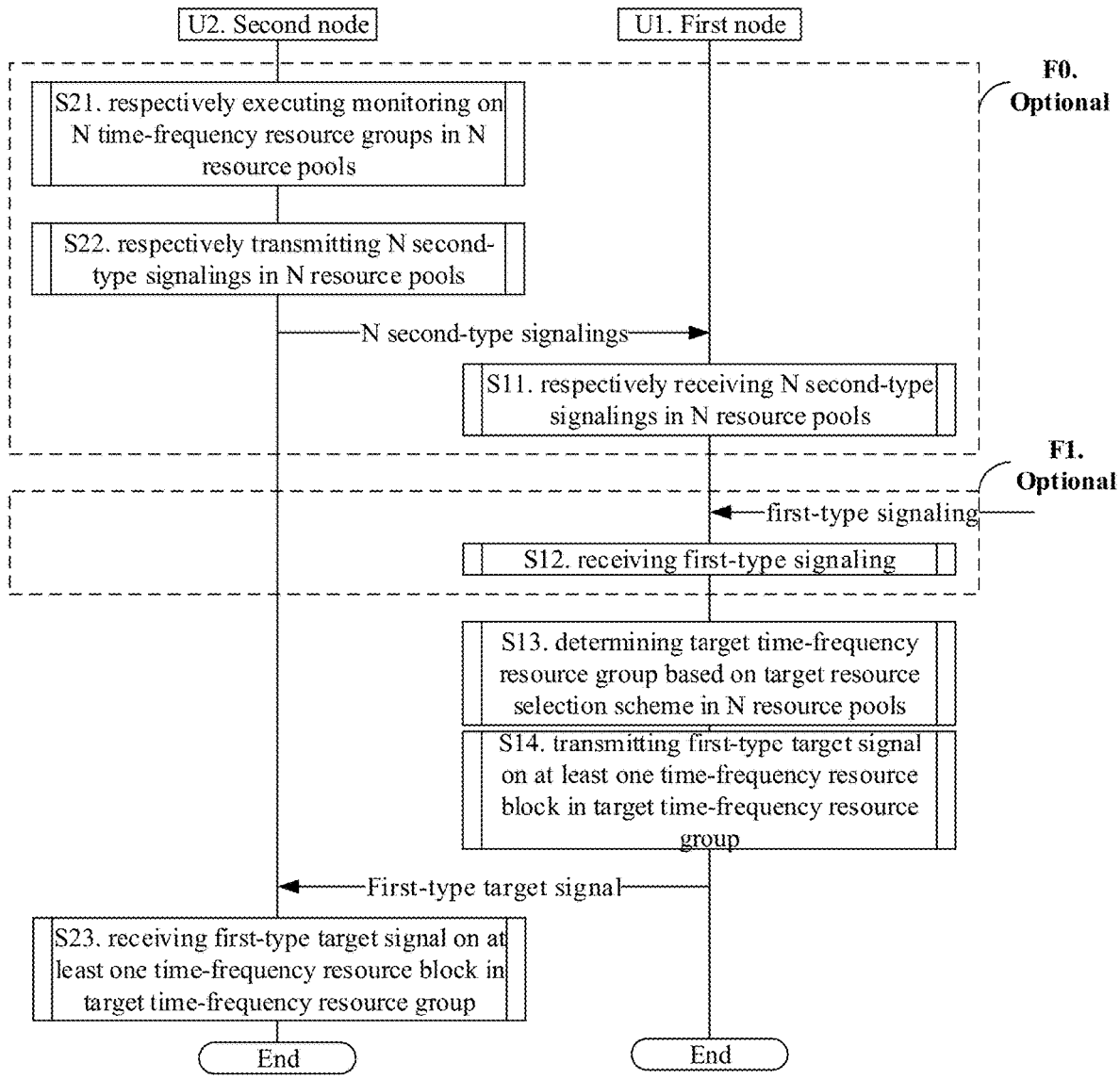
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a first node U1 and a second node U2 are in communications via an air interface. In FIG. 5, steps in dotted box F0 and in dotted box F1 are respectively optional.

The first node U1 respectively receives N second-type signalings in N resource pools in step S11, and the N second-type signalings respectively configure N resource pools; or, receives a first-type signaling in step S12, and the first-type signaling configures N resource pools; determines a target time-frequency resource group with a target resource selection scheme in N resource pools in step S13; transmits a first-type target signal on at least one time-frequency resource block in a target time-frequency resource group in step S14; N is a positive integer greater than 1.

The second node U2 respectively executes monitoring on N time-frequency resource groups in N resource pools in step S21; respectively transmits N second-type signalings in N resource pools in step S22; receives a first-type target signal on at least one time-frequency resource block in a target time-frequency resource group in step S32.

In embodiment 5, each of the N resource pools comprises multiple time-frequency resource blocks; each of the N resource pools is a first-type resource pool, or each of the N resource pools is a second-type resource pool; the target resource selection scheme is one of a first resource selection scheme or a second resource selection scheme; the target resource selection scheme is related to whether each of the N resource pools is the first-type resource pool or each of the N resource pools is the second-type resource pool; the first-type resource pool is pre-configured or is configured by the first-type signaling, and the second-type resource pool is configured by a second-type signaling; the target time-frequency resource group comprises at least one time-frequency resource block; each time-frequency resource block in the target time-frequency resource group is a time-frequency resource block in the N resource pools; when each of the N resource pools is the first-type resource pool, the target resource selection scheme is the first resource selection scheme, the first resource selection scheme comprises autonomously determining a first resource set from a first resource pool and selecting the target time-frequency resource group from the first resource set with equal probability, the first resource set belongs to the first resource pool, and the first resource pool is one of the N resource pools; when each of the N resource pools is the second-type resource pool, the target resource selection scheme is the second resource selection scheme, the N second-type signalings respectively indicate N resource sets, the N resource sets respectively belong to the N resource pool, the second resource selection scheme comprises selecting the target time-frequency resource group from a second resource set, the second resource set comprises at least one first resource subset, the first resource subset is determined by the second node U2, the target time-frequency resource group is selected from the second resource set with equal probability, and the first resource subset comprises X resource sets in the N resource sets, X being a positive integer greater than 1 and not greater than the N; any of the X resource sets comprises at least one time-frequency resource block in the target time-frequency resource group; the N second-type signalings comprise X second-type signalings, and the X second-type signalings are used to determine the X resource sets out of the N resource sets.

a first resource selection window comprises time-domain resources occupied by the target time-frequency resource group; the first resource selection window is used to determine X.

In one embodiment, a measurement value for any of the X second-type signalings is not lower than a measurement value of any second-type signaling other than the X second-type signalings in the N second-type signalings In one embodiment, the N second-type signalings respectively indicate N first-type thresholds; the N first-type thresholds are respectively used by a transmitter of the N second-type signalings to generate the N resource sets; the N first-type thresholds comprise X first-type thresholds, and the X first-type thresholds are respectively used by the second node U2 to generate the X resource sets; any of the X first-type thresholds is not greater than any first-type threshold other than the X first-type thresholds in the N first-type thresholds.

In one embodiment, the first node U1 and the second node U2 are in communications via a PC5 interface.

In one embodiment, the N resource pools are transmitted from a higher layer of the first node U1 to a physical layer of the first node U1.

In one embodiment, the first resource set is transmitted from a physical layer of the first node U1 to a higher layer of the first node U1.

In one embodiment, the N resource pools are transmitted by the second node U2 to the first node U1.

In one embodiment, the N resource sets are transmitted by the second node U2 to the first node U1.

In one embodiment, a higher layer of the first node U1 comprises at least one of an RRC layer of the first node U1 or a MAC layer of the first node U1.

In one embodiment, a higher layer of the first node U1 comprises an RRC layer of the first node U1.

In one embodiment, a higher layer of the first node U1 comprises a MAC layer of the first node U1.

In one embodiment, a higher layer of the first node U1 comprises an RRC layer of the first node U1 and a MAC layer of the first node U1.

In one embodiment, a physical layer of the first node U1 comprises a PHY layer of the first node U1.

In one embodiment, steps in box F0 in FIG. 5 exist, and steps in box F1 in FIG. 5 do not exist.

In one embodiment, steps in box F0 in FIG. 5 do not exist, and steps in box F1 in FIG. 5 exist.

In one embodiment, when steps in box F1 in FIG. 5 exist, each of the N resource pools is the first-type resource pool; when steps in box F0 in FIG. 5 exist, each of the N resource pools is the second-type resource pool.

In one embodiment, a higher layer of the first node U1 selects the target time-frequency resource group from the first resource set.

In one embodiment, a higher layer of the first node U1 selects the target time-frequency resource group from the first resource set with equal probability.

In one embodiment, a higher layer of the first node U1 randomly selects the target time-frequency resource group from the first resource set with equal probability.

In one embodiment, a higher layer of the first node U1 selects the target time-frequency resource group from the second resource set.

In one embodiment, a higher layer of the first node U1 selects the target time-frequency resource group from the second resource set with equal probability.

In one embodiment, a higher layer of the first node U1 randomly selects the target time-frequency resource group from the second resource set with equal probability.

Embodiment 6

Figure 6:
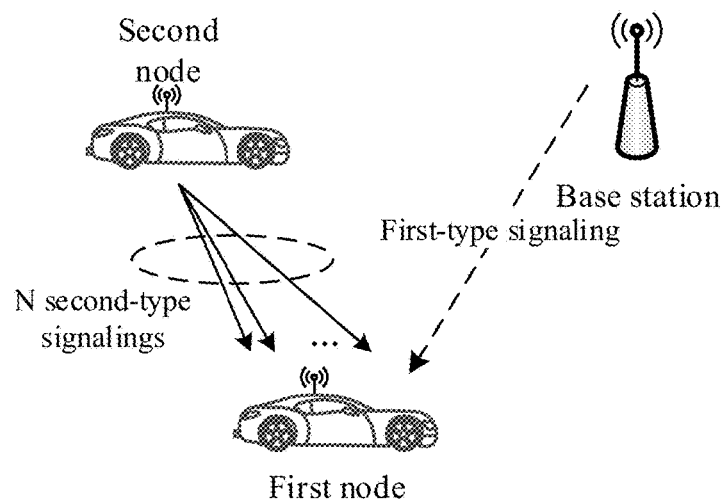
FIG. 6 illustrates a schematic diagram of relations between a first-type signaling and N second-type signalings according to one embodiment of the present application.

Embodiment 6 illustrates a schematic diagram of a relation between a first-type signaling and N second-type signalings according to one embodiment of the present application, as shown in FIG. 6.

In embodiment 6, when each of the N resource pools is pre-configured or configured by the first-type signaling, each of the N resource pools is the first-type resource pool, and the target resource selection scheme is the first resource selection scheme; when each of the N resource pools is respectively configured by the N second-type signalings, each of the N resource pools is the second-type resource pool, and the target resource selection scheme is the second resource selection scheme.

In one embodiment, the target resource selection scheme is related to a type of each of the N resource pools.

In one embodiment, a type of each of the N resource pools is used to determine the target resource selection scheme.

In one embodiment, the type of each of the N resource pools is one of the first-type resource pool or the second-type resource pool.

In one embodiment, the target resource selection scheme is related to whether each of the N resource pools is the first-type resource pool or the second-type resource pool.

In one embodiment, the target resource selection scheme is related to whether each of the N resource pools is the first-type resource pool or each of the N resource pools is the second-type resource pool.

In one embodiment, each of the N resource pools is the first-type resource pool or the second-type resource pool is used to determine the target resource selection scheme.

In one embodiment, each of the N resource pools is the first-type resource pool or each of the N resource pools is the second-type resource pool is used to determine the target resource selection scheme.

In one embodiment, each of the N resource pools is the first-type resource pool or the second-type resource pool is used to determine that the target resource selection scheme is the first resource selection scheme or the second resource selection scheme.

In one embodiment, each of the N resource pools is the first-type resource pool or each of the N resource pools is the second-type resource pool is used to determine that the target resource selection scheme is the first resource selection scheme or the target resource selection scheme is the second resource selection scheme.

In one embodiment, when each of the N resource pools is the first-type resource pool, the target resource selection scheme is the first resource selection scheme; when each of the N resource pools is the second-type resource pool, the target resource selection scheme is the second resource selection scheme.

Embodiment 7

Figure 7:
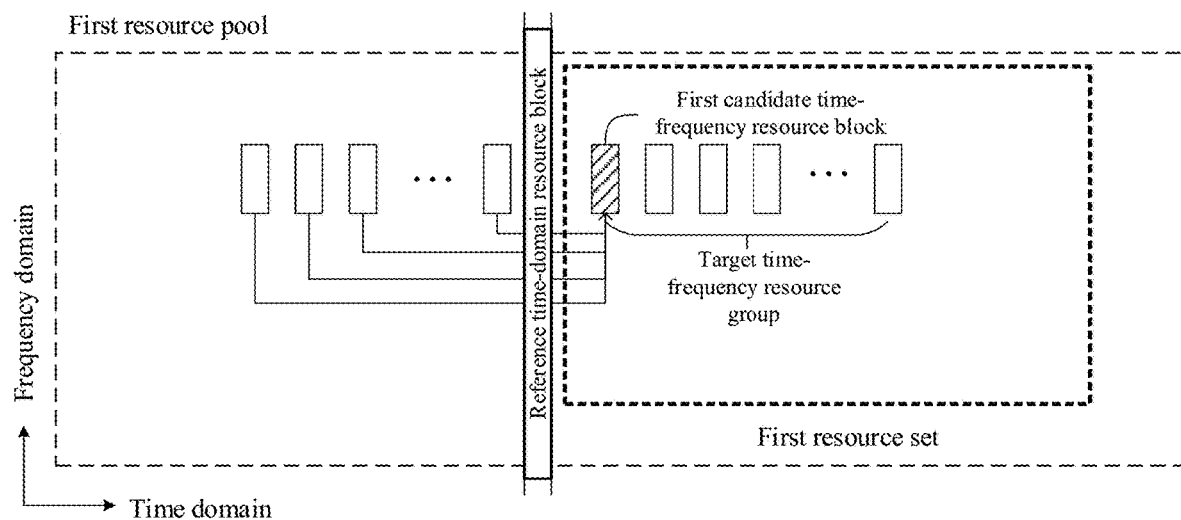
FIG. 7 illustrates a schematic diagram of relations among a first candidate time-frequency resource block, a first resource set and a target time-frequency resource group as well as a first resource pool according to one embodiment of the present application.

Embodiment 7 illustrates a schematic diagram of relations among a first candidate time-frequency resource block, a first resource set and a target time-frequency resource group and a first resource pool according to one embodiment of the present application, as shown in FIG. 7. In FIG. 7, the dotted big rectangle represents a first resource pool in the present application; the rectangle represents a time-frequency resource block in the first resource pool in the present application; the long rectangle with thick solid lines represents a reference time-domain resource block in the present application; the thick dotted rectangle represents a first resource set in the present application; the slash-filled rectangle represents the first candidate time-frequency resource block in the present application.

In embodiment 7, each of the N resource pools is the first-type resource pool, and the first resource pool is one of the N resource pools; the first resource selection scheme comprises self-determining a first resource set from the first resource pool, then selecting the target time-frequency resource group from the first resource set with equal probability, and the first resource set belongs to the first resource pool.

In one embodiment, the first resource selection scheme is triggered by a higher layer of the first node.

In one embodiment, the first resource selection scheme is triggered by a higher layer of the first node on a reference time-domain resource block.

In one embodiment, the reference time-domain resource block is one of the multiple time-frequency resource blocks comprised in the first resource pool.

In one embodiment, time-domain resources occupied by the first resource set are not earlier than the reference time-domain resource block.

In one embodiment, the first node provided related parameters of the first resource selection scheme on the reference time-domain resource block.

In one embodiment, the related parameters of the first resource selection scheme comprises at least one of the first resource pool, a priority of the first-type target signal, a remaining packet delay budget of the first-type target signal, a number of sub-channel(s) occupied by each time-frequency resource block in the target time-frequency resource group in frequency domain or a time interval between any two time-frequency resource blocks adjacent in time domain in the target time-frequency resource group.

In one embodiment, the first resource pool provided on the reference time-domain resource block by a higher layer of the first node is used for the first resource selection scheme.

In one embodiment, related parameters of the first resource pool are pre-configured, or related parameters of the first resource pool are configured by the first-type signaling In one embodiment, the related parameters of the first resource pool comprise at least one of sl-SelectionWindowList, sl-Thres-RSRP-List, sl-RS-ForSensing, sl-ResourceReservationPeriodList, sl-SensingWindow, sl-TxPercentageList or sl-PreemptionEnable.

In one embodiment, for the definition of any of sl-SelectionWindowList, sl-Thres-RSRP-List, sl-RS-ForSensing, sl-ResourceReservationPeriodList, sl-SensingWindow, sl-TxPercentageList and sl-PreemptionEnable, refer to section 8.1.4 in 3GPP TS38. 214.

In one embodiment, the priority of the first-type target signal is a positive integer.

In one embodiment, the priority of the first-type target signal is a positive integer from 1 to 8.

In one embodiment, the priority of the first-type target signal is related to an SL packet comprised in the first-type target signal.

In one embodiment, the first resource selection scheme comprises self-determining the first resource set from the first resource pool.

In one embodiment, the first resource selection scheme comprises self-determining the first resource set from the first resource pool, and the first resource pool is provided by a higher layer of the first node.

In one embodiment, the first resource selection scheme comprises that a physical layer of the first node self-determines the first resource set from the first resource pool, and the first resource pool is provided by a higher layer of the first node.

In one embodiment, the first resource selection scheme comprises that a physical layer of the first node reports the first resource set to a higher layer of the first node.

In one embodiment, the first resource selection scheme comprises that a higher layer of the first node selects the target time-frequency resource group from the first resource set with equal probability.

In one embodiment, the first resource selection scheme comprises that the first node self-determines the first resource set from the first resource pool, and the first resource pool is provided by a higher layer of the first node; a physical layer of the first node reports the first resource set to a higher layer of the first node; a higher layer of the first node selects the target time-frequency resource group from the first resource set with equal probability.

In one embodiment, the first resource selection scheme comprises that a physical layer of the first node self-determines the first resource set from the first resource pool, and the first resource pool is provided by a higher layer of the first node; a physical layer of the first node reports the first resource set to a higher layer of the first node; a higher layer of the first node selects the target time-frequency resource group from the first resource set with equal probability.

In one embodiment, for the first resource selection scheme, refer to section 8.1.4 in 3GPP TS38.214.

In one embodiment, the first resource pool comprises the first resource set.

In one embodiment, the first resource set belongs to the first resource pool.

In one embodiment, the first resource set comprises at least one time-frequency resource block in the first resource pool.

In one embodiment, the first resource set comprises multiple time-frequency resource blocks.

In one embodiment, all of the multiple time-frequency resource blocks comprised in the first resource set belong to the first resource pool.

In one embodiment, any of the multiple time-frequency resource blocks comprised in the first resource set is one of the multiple time-frequency resource blocks comprised in the first resource pool.

In one embodiment, the first resource set comprises multiple time-domain resource blocks in time domain.

In one embodiment, all of the multiple time-domain resource blocks comprised in the first resource set in time domain belong to the first resource pool.

In one embodiment, any of the multiple time-domain resource blocks comprised in the first resource set in time domain is one of the multiple time-domain resource blocks comprised by the first resource pool in time domain.

In one embodiment, the first resource set comprises multiple resource pools in frequency domain.

In one embodiment, all of the multiple frequency-domain resource blocks comprised in the first resource set in frequency domain belong to the first resource pool.

In one embodiment, any of the multiple frequency-domain resource blocks comprised in the first resource set in frequency domain is one of the multiple frequency-domain resource blocks comprised in the first resource pool in frequency domain.

In one embodiment, any of the multiple time-frequency resource blocks comprised in the first resource set is available resources used for a data transmission.

In one embodiment, any of the multiple time-frequency resource blocks comprised in the first resource set is available resources used for an SL transmission.

In one embodiment, the phrase of "self-determining the first resource set from the first resource pool" is equal to determining the first resource set by adopting the method of sensing from the first resource pool.

In one embodiment, the phrase of "self-determining the first resource set from the first resource pool" is equal to determining the first resource set by adopting the method of full sensing from the first resource pool.

In one embodiment, the phrase of "self-determining the first resource set from the first resource pool" is equal to determining the first resource set by adopting the method of partial sensing from the first resource pool.

In one embodiment, the phrase of "self-determining the first resource set from the first resource pool" is equal to determining the first resource set by adopting the method of contiguous partial sensing from the first resource pool.

In one embodiment, the phrase of "self-determining the first resource set from the first resource pool" is equal to determining the first resource set by adopting the method of periodic-based partial sensing from the first resource pool.

In one embodiment, the phrase of "self-determining the first resource set from the first resource pool" refers to determine whether a first candidate time-frequency resource block belongs to the first resource set; the first candidate time-frequency resource block is a time-frequency resource block in the first resource pool, the first candidate time-frequency resource block is associated with a first time-frequency resource group, the first time-frequency resource group comprises at least one time-frequency resource block, and the first resource pool comprises the first time-frequency resource group; a size relation between a measurement result for the first time-frequency resource group and a first threshold is used to determine whether the first candidate time-frequency resource block belongs to the first resource set, and the priority of the first-type target signal is used to determine the first threshold.

In one embodiment, each time-frequency resource block in the first time-frequency resource group is earlier than the first candidate time-frequency resource block in time domain.

In one embodiment, each time-frequency resource block in the first time-frequency resource group overlaps with the first candidate time-frequency resource block in frequency domain.

In one embodiment, a time interval between any two adjacent time-frequency resource blocks in the first time-frequency resource group is linearly correlated with a time interval between each time-frequency resource block in the first time-frequency resource group and the first candidate time-frequency resource block.

In one embodiment, the phrase of "self-determining the first resource set from the first resource pool" refers to determine whether M1 first-type candidate time-frequency resource blocks belong to the first resource set, M1 being a positive integer greater than 1; any of the M1 first-type candidate time-frequency resource blocks is a time-frequency resource block in the first resource pool, the M1 first-type candidate time-frequency resource blocks are respectively associated with M1 time-frequency resource groups, any of the M1 time-frequency resource groups comprises at least one time-frequency resource block, and the first resource pool comprises the M1 time-frequency resource groups; a size relation between M1 measurement results for the M1 time-frequency resource groups and M1 first-type thresholds is used to determine whether the M1 first-type candidate time-frequency resource blocks belong to the first resource set, and the priority of the first-type target signal is respectively used to determine the M1 first-type thresholds.

In one embodiment, the first candidate time-frequency resource block is one of the M1 first-type candidate time-frequency resource blocks.

In one embodiment, the first time-frequency resource group is one of the M1 time-frequency resource groups.

In one embodiment, the measurement result for the first time-frequency resource group is one of the M1 measurement results for the M1 time-frequency resource groups.

In one embodiment, the first threshold is one of the M1 first-type thresholds.

In one embodiment, any of the M1 first-type thresholds is a value of Reference Signal Receiving Power (RSRP) threshold.

In one embodiment, any of the M1 first-type thresholds is a value of Signal-to-Interference plus Noise Ratio (SNR) threshold.

In one embodiment, any of the M1 first-type thresholds is measured by dBm.

In one embodiment, any of the M1 first-type thresholds is measured by mW.

In one embodiment, any of the M1 first-type thresholds is one of (minus infinity) dBm, $(-128+(n-1)*2)$ dBm and (infinity) dBm, n being any positive integer from 1 to 65.

In one embodiment, the first threshold is one of (minus infinity) dBm, $(-128+(n-1)*2)$ dBm and (infinity) dBm, n being any positive integer from 1 to 65.

In one embodiment, each time-frequency resource block in the target time-frequency resource group is a time-frequency resource block in the first resource set.

In one embodiment, each time-frequency resource block in the target time-frequency resource group is selected with equal probability from the multiple time-frequency resource blocks comprised in the first resource set.

In one embodiment, each time-frequency resource block in the target time-frequency resource group is selected with equal probability from the multiple time-frequency resource blocks comprised in the first resource set.

In one embodiment, the multiple time-frequency resource blocks comprised in the target time-frequency resource group is selected with equal probability from the multiple time-frequency resource blocks comprised in the first resource set.

Embodiment 8

Figure 8:
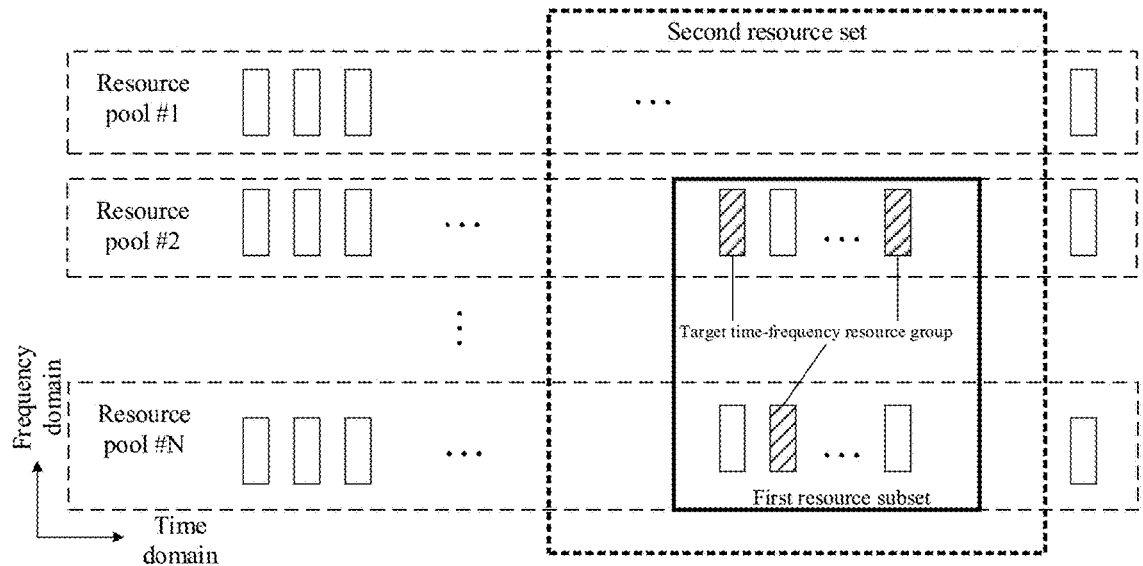
FIG. 8 illustrates a schematic diagram of relations among a second resource set, a first resource subset and a target time-frequency resource group as well as N resource pools according to one embodiment of the present application.

Embodiment 8 illustrates a schematic diagram of relations among a second resource set, a first resource subset and a target time-frequency resource group and N resource pools according to one embodiment of the present application, as shown in FIG. 8. In FIG. 8, the dotted big rectangle represents N resource pools in the present application; the rectangle represents a time-frequency resource block in the first resource pool in the present application; the thick dotted rectangle represents a second resource set in the present application; the thick solid-line rectangle represents a first resource subset in the present application; the slash-filled rectangle represents a time-frequency resource block in a target time-frequency resource group in the present application.

In embodiment 8, each of the N resource pools is the second-type resource pool; the N resource pools respectively comprise N resource sets, and the N resource sets are respectively indicated by the N second-type signalings; the first resource subset comprises at least one of the N resource sets; the second resource set at least comprises the first resource subset; the second resource selection scheme comprises selecting the target time-frequency resource group from the second resource set.

In one embodiment, the second-type signaling is any of the N second-type signalings.

In one embodiment, the N second-type signalings respectively correspond to the N resource sets.

In one embodiment, the N second-type signalings respectively correspond to the N resource sets, and the N second-type respectively correspond to the N resource pools.

In one embodiment, the N second-type signalings respectively indicate the N resource sets.

In one embodiment, the N second-type signalings respectively indicate the N resource sets, and the N resource sets respectively belong to the N resource pools.

In one embodiment, the N second-type signalings respectively indicate the N resource sets, the N resource sets respectively belong to the N resource pools, and each of the N resource pools is the second-type resource pool.

In one embodiment, the N second-type signalings are respectively transmitted in the N resource pools, and the N second-type signalings respectively indicate the N resource sets from N resource pools.

In one embodiment, the N second-type signalings are respectively transmitted in the N resource pools, the N second-type signalings respectively indicate the N resource sets from N resource pools, and each of the N resource pools is the second-type resource pool.

In one embodiment, any of the N second-type signalings indicates one of the N resource sets.

In one embodiment, any of the N second-type signalings is transmitted in one of the N resource pools, and the second-type signaling in the N second-type signalings indicates one of the N resource sets.

In one embodiment, any of the N second-type signalings is transmitted in one of the N resource pools, the second-type signaling in the N second-type signalings indicates one of the N resource sets, and the resource pool in the N resource pools is the second-type resource pool.

In one embodiment, the second-type signaling indicates one of the N resource sets.

In one embodiment, the second-type signaling is transmitted in one of the N resource pools, and the second-type signaling indicates one of the N resource sets from the resource pool in the N resource pools.

In one embodiment, the second-type signaling is transmitted in one of the N resource pools, the second-type signaling indicates one of the N resource sets from the resource pool in the N resource pools, and the resource pool of the N resource pools is the second-type resource pool.

In one embodiment, the N second-type signalings respectively indicate time-domain resources occupied by the N resource sets.

In one embodiment, the N second-type signalings respectively indicate frequency-domain resources occupied by the N resource sets.

In one embodiment, the N second-type signalings respectively indicate time-domain resources occupied by the N resource sets, and the N second-type signalings respectively indicate frequency-domain resources occupied by the N resource sets.

In one embodiment, any of the N second-type signalings indicates time-domain resources occupied by one of the N resource sets.

In one embodiment, any of the N second-type signalings indicates frequency-domain resources occupied by one of the N resource sets.

In one embodiment, any of the N second-type signalings indicates time-domain resources and frequency-domain resources occupied by one of the N resource sets.

In one embodiment, the second-type signaling indicates time-domain resources occupied by one of the N resource sets.

In one embodiment, the second-type signaling indicates frequency-domain resources occupied by one of the N resource sets.

In one embodiment, the second-type signaling indicates time-domain resources and frequency-domain resources occupied by one of the N resource sets.

In one embodiment, a target second-type signaling is any of the N second-type signalings, and a target resource pool is one of the N resource pools; the target second-type signaling is transmitted in the target resource pool.

In one embodiment, a target second-type signaling is any of the N second-type signalings, and a target resource set is one of the N resource sets; the target second-type signaling indicates the target resource set.

In one embodiment, a target second-type signaling is any of the N second-type signalings, a target resource pool is one of the N resource pools, and a target resource set is one of the N resource sets; the target second-type signaling indicates the target resource set, and the target resource pool comprises the target resource set.

In one embodiment, a target second-type signaling is any of the N second-type signalings, a target resource pool is one of the N resource pools, and a target resource set is one of the N resource sets; the target second-type signaling is transmitted in the target resource pool, the target second-type signaling indicates the target resource set, and the target resource pool comprises the target resource set.

In one embodiment, a target second-type signaling is any of the N second-type signalings, a target resource pool is one of the N resource pools, and a target resource set is one of the N resource sets; the target second-type signaling is transmitted in the target resource pool, the target second-type signaling indicates the target resource set, the target resource pool comprises the target resource set, and the target resource pool is the second-type resource pool.

In one embodiment, a target second-type signaling is any of the N second-type signalings, a target resource pool is one of the N resource pools, and a target resource set is one of the N resource sets; the target second-type signaling is transmitted in the target resource pool, the target second-type signaling indicates the target resource set from the target resource pool, and the target resource pool comprises the target resource set.

In one embodiment, a target second-type signaling is any of the N second-type signalings, a target resource pool is one of the N resource pools, and a target resource set is one of the N resource sets; the target second-type signaling is transmitted in the target resource pool, the target second-type signaling indicates the target resource set from the target resource pool, the target resource pool comprises the target resource set, and the target resource pool is the second-type resource pool.

In one embodiment, the N resource pools respectively comprise the N resource sets.

In one embodiment, the N resource sets respectively belong to the N resource pools.

In one embodiment, the N resource pools respectively comprise the N resource sets, and each of the N resource pools is the second-type resource pool.

In one embodiment, the N resource pools are respectively configured by the N second-type signalings, the N resource pools respectively comprise the N resource sets, and each of the N resource pools is the second-type resource pool.

In one embodiment, any of the N resource sets comprises at least one time-frequency resource block.

In one embodiment, any of the N resource sets comprises multiple time-frequency resource blocks.

In one embodiment, the N resource sets respectively correspond to the N resource pools.

In one embodiment, the N resource sets respectively correspond to the N resource pools, and each time-frequency resource block comprised in any of the N resource sets belongs to a resource pool corresponding to the resource set among the N resource pools.

In one embodiment, the N resource sets respectively correspond to the N resource pools, and each time-frequency resource block comprised in any of the N resource sets is a time-frequency resource block in a resource pool corresponding to the resource set among the N resource pools.

In one embodiment, the N resource sets respectively correspond to the N resource pools, a first target resource pool is any of the N resource pools, and a first target resource set is a resource set corresponding to the first target resource pool among the N resource sets.

In one embodiment, the first target resource pool comprises the first target resource set.

In one embodiment, the first target resource set comprises at least one time-frequency resource block in the first target resource pool.

In one embodiment, each time-frequency resource block in the first target resource set is a time-frequency resource block in the first target resource pool.

In one embodiment, at least two of the N resource sets are FDM.

In one embodiment, at least two of the N resource sets are TDM.

In one embodiment, any two of the N resource sets are FDM.

In one embodiment, any two of the N resource sets are TDM.

In one embodiment, at least two of the N resource sets are orthogonal.

In one embodiment, at least two of the N resource sets are orthogonal in frequency domain.

In one embodiment, at least two of the N resource sets are orthogonal in time domain.

In one embodiment, any two of the N resource sets are orthogonal.

In one embodiment, any two of the N resource sets are orthogonal in frequency domain.

In one embodiment, any two of the N resource sets are orthogonal in time domain.

In one embodiment, any of the N resource sets comprises at least one time-domain resource block in time domain.

In one embodiment, any of the N resource sets comprises multiple time-domain resource blocks in time domain.

In one embodiment, any of the N resource sets comprises at least one frequency-domain resource block in frequency domain.

In one embodiment, any of the N resource sets comprises multiple frequency-domain resource blocks in frequency domain.

In one embodiment, a second target resource set is any of the N resource sets, the second target resource set comprises at least one time-domain resource block in time domain, and the second target resource set comprises multiple frequency-domain resource blocks in frequency domain.

In one embodiment, a second target resource set is any of the N resource sets, the second target resource set comprises at least one frequency-domain resource block in frequency domain, and the second target resource set comprises multiple time-domain resource blocks in time domain.

In one embodiment, each time-frequency resource block in any of the N resource sets is available resources used for a data transmission.

In one embodiment, each time-frequency resource block in any of the N resource sets is available resources used for an SL transmission.

In one embodiment, the first resource subset is determined by a transmitter of the second-type signaling In one embodiment, the first resource subset is determined by the second node.

In one embodiment, the first resource subset is determined by the second node itself.

In one embodiment, the phrase of "the first resource subset being determined by a transmitter of the second-type signaling" is equal to that the transmitter of the second-type signaling determines the first resource subset by adopting the method of sending.

In one embodiment, the phrase of "the first resource subset being determined by a transmitter of the second-type signaling" is equal to that the transmitter of the second-type signaling determines the first resource subset by adopting the method of Full Sensing.

In one embodiment, the phrase of "the first resource subset being determined by a transmitter of the second-type signaling" is equal to that the transmitter of the second-type signaling determines the first resource subset by adopting the method of Partial Sensing.

In one embodiment, the phrase of "the first resource subset being determined by a transmitter of the second-type signaling" is equal to that the transmitter of the second-type signaling determines the first resource subset by adopting the method of Contiguous Partial Sensing.

In one embodiment, the phrase of "the first resource subset being determined by a transmitter of the second-type signaling" is equal to that the transmitter of the second-type signaling determines the first resource subset by adopting the method of Periodic-based Partial Sensing.

In one embodiment, the phrase of "the first resource subset being determined by a transmitter of the second-type signaling" refers to that a transmitter of the second-type signaling determines whether a second candidate time-frequency resource block belongs to the first resource subset; the second candidate time-frequency resource block is a time-frequency resource block in any of the N resource pools, the second candidate time-frequency resource block is associated with a second time-frequency resource group, the second time-frequency resource group comprises at least one time-frequency resource block, and the second time-frequency resource group belongs to any of the N resource pools; a size relation between a measurement result for the second time-frequency resource group and a second threshold is used to determine whether the second candidate time-frequency resource block belongs to the first resource subset, and the priority of the first-type target signal is used to determine the second threshold.

In one embodiment, each time-frequency resource block in the second time-frequency resource group is earlier than the second candidate time-frequency resource block in time domain.

In one embodiment, each time-frequency resource block in the second time-frequency resource group overlaps with the second candidate time-frequency resource block in frequency domain.

In one embodiment, a time interval between any two adjacent time-frequency resource blocks in the second time-frequency resource group is linearly associated with a time interval between each time-frequency resource block in the second time-frequency resource group and the second candidate time-frequency resource block.

In one embodiment, the phrase of "the first resource subset being determined by a transmitter of the second-type signaling" refers to that a transmitter of the second-type signaling determines whether M2 second-type candidate time-frequency resource blocks belong to the first resource set, M2 being a positive integer greater than 1; any of the M2 second-type candidate time-frequency resource blocks is a time-frequency resource block in any of the N resource pools, the M2 second-type candidate time-frequency resource blocks are respectively associated with M2 time-frequency resource groups, any of the M2 time-frequency resource groups comprises at least one time-frequency resource block, and any of the N resource pools comprises one of the M2 time-frequency resource groups; a size relation between M2 measurement results for the M2 time-frequency resource groups and M2 second-type thresholds is used to determine whether the M2 second-type candidate time-frequency resource blocks belong to the first resource set, and the priority of the first-type target signal is respectively used to determine the M2 second-type thresholds.

In one embodiment, the second candidate time-frequency resource block is one of the M2 second-type candidate time-frequency resource blocks.

In one embodiment, the second time-frequency resource group is one of the M2 time-frequency resource groups.

In one embodiment, the measurement result for the second time-frequency resource block is one of the M2 measurement results for the M2 time-frequency resource groups.

In one embodiment, the second threshold is one of the M2 second-type thresholds.

In one embodiment, any of the M2 second-type thresholds is an RSRP threshold.

In one embodiment, any of the M2 second-type thresholds is an SINR threshold.

In one embodiment, any of the M2 second-type thresholds is measured by dBm.

In one embodiment, any of the M2 second-type thresholds is measured by mW.

In one embodiment, any of the M2 second-type thresholds is one of (minus infinity) dBm, $(-128+(n-1)*2)$ dBm and (infinity) dBm, n being any positive integer from 1 to 65.

In one embodiment, the second threshold is one of (minus infinity) dBm, $(-128+(n-1)*2)$ dBm and (infinity) dBm, n being any positive integer from 1 to 65.

In one embodiment, the phrase of "the first resource subset being determined by a transmitter of the second-type signaling" refers to that the transmitter of the second-type signaling respectively determines the N resource sets from the N resource pools, and the N resource sets are used to determine the first resource subset.

In one embodiment, the first resource subset comprises at least one of the N resource sets.

In one embodiment, the first resource subset comprises one of the N resource sets.

In one embodiment, the first resource subset comprises all of the N resource sets.

In one embodiment, the first resource subset comprises X resource sets in the N resource sets, X being a positive integer greater than 1 and not greater than N.

In one embodiment, the first resource subset is one of the N resource sets.

In one embodiment, the first resource subset is all of the N resource sets.

In one embodiment, the first resource subset is X resource sets in the N resource sets, X being a positive integer greater than 1 and not greater than N.

In one embodiment, the first resource subset comprises multiple time-frequency resource blocks, and any of the multiple time-frequency resource blocks comprised in the first resource subset is a time-frequency resource block in the N resource sets.

In one embodiment, the first resource subset comprises multiple time-frequency resource blocks, and at least two time-frequency resource blocks in the multiple time-frequency resource blocks comprised in the first resource subset respectively belong to two different resource sets in the N resource sets.

In one embodiment, the first resource subset comprises X time-frequency resource blocks, and the X time-frequency resource blocks comprised in the first resource subset respectively belong to the X resource sets in the N resource sets, X being a positive integer greater than 1 and not greater than the N.

In one embodiment, each time-frequency resource block in the first resource subset is determined by the transmitter of the second-type signaling.

In one embodiment, all time-frequency resource blocks in the first resource subset are determined by the transmitter of the second-type signaling.

In one embodiment, the second resource set comprises multiple time-frequency resource blocks.

In one embodiment, any of the multiple time-frequency resource blocks comprised in the second resource set is available resources used for a data transmission.

In one embodiment, any of the multiple time-frequency resource blocks comprised in the second resource set is available resources used for an SL transmission.

In one embodiment, the second resource set comprises multiple time-domain resource blocks in time domain.

In one embodiment, the second resource set comprises multiple frequency-domain resource blocks in frequency domain.

In one embodiment, any time-frequency resource block in the second resource set belongs to the N resource pools.

In one embodiment, any time-frequency resource block in the second resource set belongs to the N resource sets.

In one embodiment, at least one time-frequency resource block in the second resource set does not belong to the N resource sets.

In one embodiment, the second resource set comprises at least the first resource subset.

In one embodiment, the second resource set only comprises the first resource subset.

In one embodiment, each of the multiple time-frequency resource blocks comprised in the second resource set is a time-frequency resource block in the first resource subset.

In one embodiment, the second resource set comprises the first resource subset and at least one time-frequency resource block other than the first resource subset.

In one embodiment, the second resource set comprises the first resource subset and a second resource subset, the second resource subset comprises at least one time-frequency resource block, and the second resource subset is determined by the first node itself.

In one embodiment, each time-frequency resource block in the second resource subset is a time-frequency resource block in the N resource pools.

In one embodiment, at least time-frequency resource block in the second resource subset is different from any time-frequency resource block in the N resource pools.

In one embodiment, the second resource selection scheme comprises selecting the target time-frequency resource group from the second resource set.

In one embodiment, the second resource selection scheme comprises selecting the target time-frequency resource group from the second resource set with equal probability.

In one embodiment, the second resource set comprises the first resource subset and a second resource subset, the second resource selection scheme selects the target time-frequency resource group from the multiple time-frequency resource blocks comprised in the second resource set with equal probability.

In one embodiment, the second resource set comprises the first resource subset and a second resource subset, and each time-frequency resource block in the target time-frequency resource group is selected from the multiple time-frequency resource blocks comprised in the second resource set with equal probability.

In one embodiment, the second resource set comprises the first resource subset and a second resource subset, and the second resource selection scheme preferentially selects the target time-frequency resource group from a former of the first resource subset and the second resource subset.

In one embodiment, the second resource set comprises the first resource subset and a second resource subset, and the second resource selection scheme preferentially selects the target time-frequency resource group from a former of the first resource subset and the second resource subset.

In one embodiment, the second resource set comprises the first resource subset and a second resource subset, and the second resource selection scheme preferentially selects the target time-frequency resource group from the multiple time-frequency resource blocks comprised in a former of the first resource subset and the second resource subset.

In one embodiment, the second resource set comprises the first resource subset and a second subset, a time-frequency resource block in the target time-frequency resource group is preferentially selected from the multiple time-frequency resource blocks comprised in a former of the first resource subset and a second resource subset.

In one embodiment, the second resource set comprises the first resource subset and a second subset, each time-frequency resource block in the target time-frequency resource group is preferentially selected from the multiple time-frequency resource blocks comprised in a former of the first resource subset and a second resource subset.

In one embodiment, the second resource set comprises the first resource subset and a second resource subset, and each time-frequency resource block in the target time-frequency resource group is a time-frequency resource block in the first resource subset.

In one embodiment, the second resource set comprises the first resource subset and a second resource subset, at least one time-frequency resource block in the target time-frequency resource group is a time-frequency resource block in the first resource subset, and at least one time-frequency resource block in the target time-frequency resource group is a time-frequency resource block in the second resource subset.

In one embodiment, the second resource set comprises the first resource subset and a second resource subset, and at least two time-frequency resource blocks in the target time-frequency resource group respectively belong the first resource subset and the second resource subset.

In one embodiment, the first resource subset comprises X resource sets in the N resource sets, X being a positive integer greater than 1 and not greater than N; any of the X resource sets comprises at least one time-frequency resource block in the target time-frequency resource group.

In one embodiment, a first target time-frequency resource block and a second target time-frequency resource block are any two of the multiple time-frequency resource blocks comprised in the target time-frequency resource group, and both the first target time-frequency resource block and the second target time-frequency resource block belong to the first resource subset in the second resource set.

In one embodiment, a first target time-frequency resource block and a second target time-frequency resource block are any two of the multiple time-frequency resource blocks comprised in the target time-frequency resource group, the first target time-frequency resource block belongs to the first resource subset in the second resource set, and the second target time-frequency resource block belongs to the second resource subset in the second resource set.

In one embodiment, a first target time-frequency resource block and a second target time-frequency resource block are any two of the multiple time-frequency resource blocks comprised in the target time-frequency resource group, both the first target time-frequency resource block and the second target time-frequency resource block belong to the first resource subset, and the first target time-frequency resource block and the second target time-frequency resource block respectively belong to two different resource sets of the N resource sets.

In one embodiment, a first target time-frequency resource block and a second target time-frequency resource block are any two of the multiple time-frequency resource blocks comprised in the target time-frequency resource group, both the first target time-frequency resource block and the second target time-frequency resource block belong to the first resource subset, and the first target time-frequency resource block and the second target time-frequency resource block are respectively time-frequency resource blocks in two different resource sets of the N resource sets.

In one embodiment, a first target time-frequency resource block and a second target time-frequency resource block are two of the multiple time-frequency resource blocks comprised in the target time-frequency resource group, the first target time-frequency resource block is a time-frequency resource block in a first candidate resource set, the second target time-frequency resource block is a time-frequency resource block in a second candidate resource set, and the first candidate resource set and the second candidate resource set are respectively two of the N resource sets.

In one embodiment, the target resource selection scheme is one of the first resource selection scheme or the second resource selection scheme.

In one embodiment, the target resource selection scheme is the first resource selection scheme, or the target resource selection scheme is the second resource selection scheme.

In one embodiment, the target resource selection scheme is the first resource selection scheme.

In one embodiment, the target resource selection scheme is the second resource selection scheme.

In one embodiment, the target resource selection scheme is related to whether each of the N resource pools is the first-type resource pool or each of the N resource pools is the second-type resource pool.

In one embodiment, whether the target resource selection scheme is the first resource selection scheme or the second resource selection scheme is related to whether each of the N resource pools is the first-type resource pool or each of the N resource pools is the second-type resource pool.

In one embodiment, each of the N resource pools is the first-type resource pool or each of the N resource pools is the second-type resource pool is used to determine the target resource selection scheme.

In one embodiment, each of the N resource pools is the first-type resource pool or each of the N resource pools is the second-type resource pool is used to determine that the target resource selection scheme is one of the first resource selection scheme or the second resource selection scheme.

In one embodiment, when each of the N resource pools is the first-type resource pool, the target resource selection scheme is the first resource selection scheme; when each of the N resource pools is the second-type resource pool, the target resource selection scheme is the second resource selection scheme.

In one embodiment, when each of the N resource pools is pre-configured, or, each of the N resource pools is configured by the first-type signaling, the target resource selection scheme is the first resource selection scheme; when each of the N resource pools is configured by the second-type signaling, the target resource selection scheme is the second resource selection scheme.

In one embodiment, when each of the N resource pools is configured by the first-type signaling, the target resource selection scheme is the first resource selection scheme; when each of the N resource pools is configured by the second-type signaling, the target resource selection scheme is the second resource selection scheme.

In one embodiment, when each of the N resource pools is configured, the target resource selection scheme is the first resource selection scheme; when each of the N resource pools is configured by the first-type signaling, the target resource selection scheme is the first resource selection scheme; when each of the N resource pools is configured by the second-type signaling, the target resource selection scheme is the second resource selection scheme.

Embodiment 9

Figure 9:
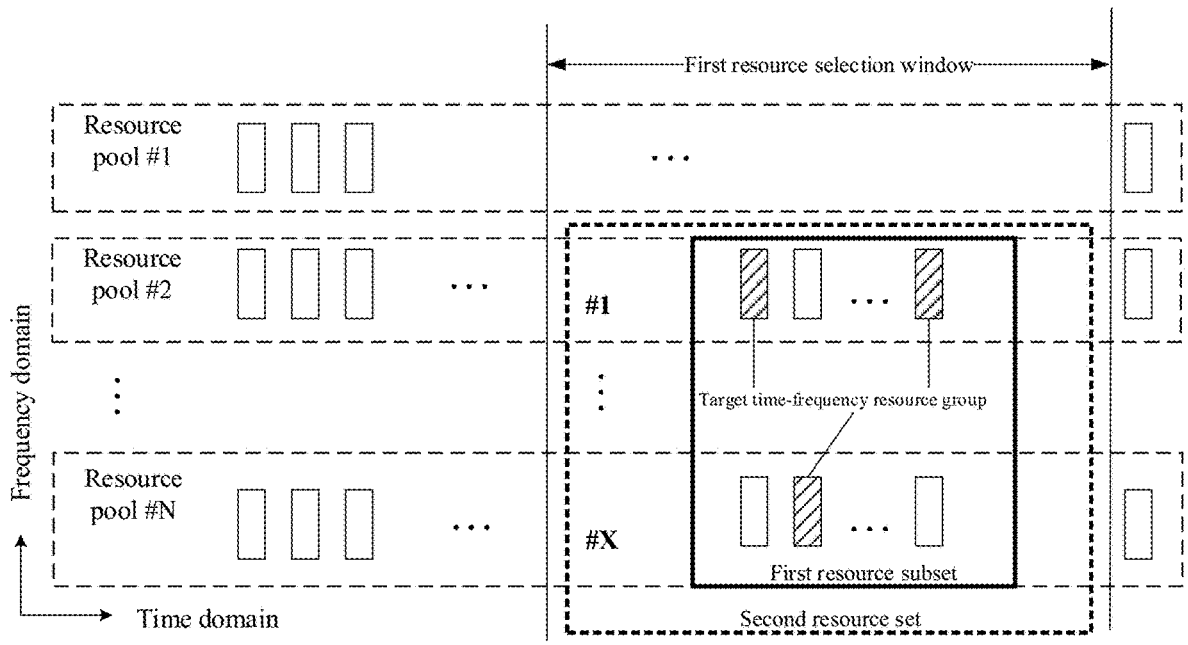
FIG. 9 illustrates a schematic diagram of a relation between a first resource selection window and a target time-frequency resource group according to one embodiment of the present application.

Embodiment 9 illustrates a schematic diagram of a relation between a first resource selection window and a target time-frequency resource group according to one embodiment of the present application, as shown in FIG. 9. In FIG. 9, the dotted big rectangle represents N resource pools in the present application; the rectangle represents a time-frequency resource block in the first resource pool in the present application; the thick dotted box represents a second resource set in the present application; the thick solid rectangle represents a first resource subset in the present application; the slash-filled rectangle represents a time-frequency resource block in a target time-frequency resource group in the present application; the space between the two vertical solid lines represents a first resource selection window in the present application.

In embodiment 9, the first resource selection window is used to determine the second resource set, and the second resource set comprises the target time-frequency resource group; the first resource selection window is used to determine X.

In one embodiment, the first Resource Selection Window (RSW) comprises multiple time-domain resource blocks.

In one embodiment, the N resource pools comprise the first resource selection window in time domain.

In one embodiment, time-domain resources occupied by the N resource pool in time domain comprise the first resource selection window.

In one embodiment, any of the multiple time-domain resource blocks comprised in the first resource selection window is one of the multiple time-domain resource blocks comprised in the N resource pools in time domain.

In one embodiment, the multiple time-domain resource blocks comprised in the first resource selection window are respectively multiple slots.

In one embodiment, the multiple time-domain resource blocks comprised in the first resource selection window are respectively multiple slots in the N resource pools.

In one embodiment, any of the multiple time-domain resource blocks comprised in the first resource selection window comprises a positive integer number of multicarrier symbol(s).

In one embodiment, time-domain resources occupied by the second resource set belong to the first resource selection window.

In one embodiment, time-domain resources occupied by any of the second resource set belong to the first resource selection window.

In one embodiment, an earliest time-frequency resource block in time domain among the multiple time-frequency resource blocks comprised in the second resource set is not earlier than a start time of the first resource selection window.

In one embodiment, a latest time-frequency resource block in time domain among the multiple time-frequency resource blocks comprised in the second resource set is not later than an end time of the first resource selection window.

In one embodiment, the first resource selection window is used to determine the X resource sets.

In one embodiment, the first resource selection window is used to determine the X resource sets out of the N resource sets.

In one embodiment, the first resource selection window is used to determine the X resource sets, and any of the X resource sets comprises at least one time-frequency resource block in the target time-frequency resource group.

In one embodiment, a length of the first resource selection window is used to determine the X resource sets.

In one embodiment, a length of the first resource selection window is used to determine the X resource sets out of the N resource sets.

In one embodiment, a length of the first resource selection window is used to determine the X resource sets, and any of the X resource sets comprises at least one time-frequency resource block in the target time-frequency resource group.

In one embodiment, the first resource selection window is used to determine X.

In one embodiment, a length of the first resource selection window is used to determine X.

In one embodiment, an end time of the first resource selection window is used to determine X.

In one embodiment, X is linearly correlated with a length of the first resource selection window.

In one embodiment, X is inversely proportional to a length of the first resource selection window.

In one embodiment, the shorter a length of the first resource selection window, the larger the X.

In one embodiment, the longer a length of the first resource selection window, the smaller the X.

In one embodiment, the shorter a length of the first resource selection window, the larger the X; the longer a length of the first resource selection window, the smaller the X.

In one embodiment, a length of the first resource selection window is one of a first length or a second length, and the first length is greater than the second length.

In one embodiment, X is equal to one of a first value or a second value, and the first value is less than the second value.

In one embodiment, when a length of the first resource selection window is the first length, X is equal to the first value; when a length of the first resource selection window is the second length, X is equal to the second value.

In one embodiment, the N second-type signalings comprise X second-type signalings, and the X second-type signalings are used to determine the X resource sets out of the N resource sets.

In one embodiment, X second-type signalings in the N second-type signalings are used to indicate the X resource sets in the N resource sets; a measurement value for any of the X second-type signalings is not less than a measurement value of any second-type signaling other than the X second-type signalings in the N second-type signalings.

In one embodiment, the measurement value for any of the X second-type signalings is an RSRP.

In one embodiment, the measurement value for any of the X second-type signalings is an SINR.

In one embodiment, the measurement value for any of the X second-type signalings is Reference Signal Receiving Quality (RSRQ).

In one embodiment, the N second-type signalings respectively indicate N first-type thresholds; the N first-type thresholds are respectively used by a transmitter of the N second-type signalings to generate the N resource sets; the N first-type thresholds comprise X first-type thresholds, the X first-type thresholds are respectively used by a transmitter of the N second-type signalings to generate the X resource sets; any of the X first-type thresholds is not greater than any first-type threshold other than the X first-type thresholds in the N first-type thresholds.

In one embodiment, any of the N first-type thresholds is an RSRP threshold.

In one embodiment, any of the N first-type thresholds is an SINR threshold.

Embodiment 10

Figure 10:
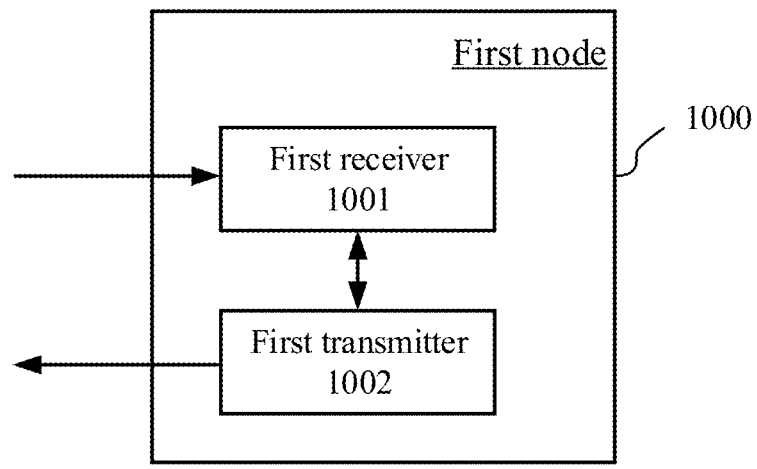
FIG. 10 illustrates a structure block diagram of a processor in a first node according to one embodiment of the present application.
Figure 11:
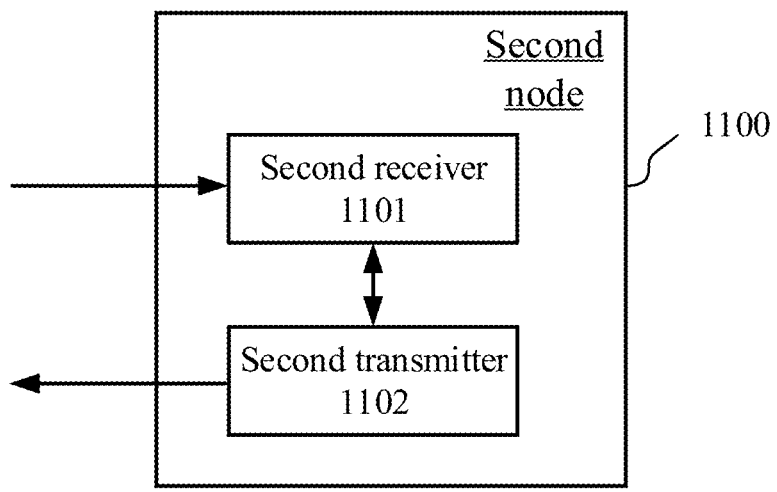
FIG. 11 illustrates a structure block diagram of a processor in a second node according to one embodiment of the present application.

Embodiment 10 illustrates a structure block diagram of a processor in a first node, as shown in FIG. 10. In embodiment 10, a processor 1000 of a first node is mainly consists of a first receiver 1001 and a first transmitter 1002.

In one embodiment, the first receiver 1001 comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 1002 comprises at least one of the antenna 452, the transmitter/receiver 454, the multi-antenna transmitting processor 457, the transmitting processor 468, the controller/processor 459, the memory 460, or the data source 467 in FIG. 4 of the present application.

In embodiment 10, the first receiver 1001 determines a target time-frequency resource group based on a target resource selection scheme in N resource pools, the target time-frequency resource group comprises at least one time-frequency resource block, N being a positive integer greater than 1, the target resource selection scheme is one of a first resource selection scheme or a second resource selection scheme, each of the N resource pools is a first-type resource pool, or, each of the N resource pools being a second-type resource pool; and the first transmitter 1002 transmits a first-type target signal on at least one time-frequency resource block in the target time-frequency resource group; each of the N resource pools comprises multiple time-frequency resource blocks; each time-frequency resource block in the target time-frequency resource group is a time-frequency resource block in the N resource pools; the target resource selection scheme is related to whether each of the N resource pools is the first-type resource pool or each of the N resource pools is the second-type resource pool; the first-type resource pool is pre-configured or is configured by a first-type signaling, and the second-type resource pool is configured by a second-type signaling; when each of the N resource pools is the first-type resource pool, the target resource selection scheme is the first resource selection scheme; when each of the N resource pools is the second-type resource pool, the target resource selection scheme is the second resource selection scheme; the first resource selection scheme comprises autonomously determining a first resource set from a first resource pool and selecting the target time-frequency resource group from the first resource set with equal probability, the first resource set belongs to the first resource pool, and the first resource pool is one of the N resource pools; the second resource selection scheme comprises selecting the target time-frequency resource group from a second resource set, the second resource set comprises at least a first resource subset, and the first resource subset is determined by a transmitter of the second-type signaling.

In one embodiment, the first receiver 1001 receives N second-type signalings, the N second-type signalings respectively indicate N resource sets, and the N resource sets respectively belong to the N resource pools; each of the N resource pools is the second-type resource pool, the target resource selection scheme is the second resource selection scheme; the first resource subset comprises at least one of the N resource sets.

In one embodiment, the target time-frequency resource group is selected from the second resource set with equal probability.

In one embodiment, the first resource subset comprises X resource sets in the N resource sets, X being a positive integer greater than 1 and not greater than N; any of the X resource sets comprises at least one time-frequency resource block in the target time-frequency resource group.

a first resource selection window comprises time-domain resources occupied by the target time-frequency resource group; the first resource selection window is used to determine X.

In one embodiment, the N second-type signalings comprise X second-type signalings, and the X second-type signalings are used to determine the X resource sets out of the N resource sets.

In one embodiment, X second-type signalings in the N second-type signalings are used to indicate the X resource sets in the N resource sets; a measurement value for any of the X second-type signalings is not less than a measurement value of any second-type signaling other than the X second-type signalings in the N second-type signalings.

In one embodiment, the N second-type signalings respectively indicate N first-type thresholds; the N first-type thresholds are respectively used by a transmitter of the N second-type signalings to generate the N resource sets; the N first-type thresholds comprise X first-type thresholds, the X first-type thresholds are respectively used by a transmitter of the N second-type signalings to generate the X resource sets; any of the X first-type thresholds is not greater than any first-type threshold other than the X first-type thresholds in the N first-type thresholds.

In one embodiment, the first node 1000 is a UE.

In one embodiment, the first node 1000 is a relay node.

In one embodiment, the first node 1000 is a base station.

Embodiment 11

Embodiment 10 illustrates a structure block diagram of a processor in a second node, as shown in FIG. 10. In embodiment 11, a processor 1100 in a second node mainly consists of a second receiver 1101 and a second transmitter 1102.

In one embodiment, the second receiver 1101 comprises at least one of the antenna 420, the transmitter/receiver 418, the multi-antenna receiving processor 472, the receiving processor 470, the controller/processor 475 or the memory 476 in FIG. 4 of the present application.

In one embodiment, the second transmitter 1102 comprises at least one of the antenna 420, the transmitter/receiver 418, the multi-antenna transmitting processor 471, the transmitting processor 416, the controller/processor 475 or the memory 476 in FIG. 4 of the present application.

In embodiment 11, the second receiver 1101 respectively executes monitoring on N time-frequency resource groups in N resource pools, N being a positive integer greater than 1; the second transmitter 1102 respectively transmits N second-type signalings in N resource pools, the N second-type signalings respectively indicate N resource sets, the N resource sets respectively belong to the N resource pools; each of the N resource pools comprises multiple time-frequency resource blocks; the N time-frequency resource groups respectively belong to the N resource pools; each of the N time-frequency resource groups comprises multiple time-frequency resource blocks; the monitorings performed on the N time-frequency resource groups are respectively used by the second node to determine the N resource sets by itself.

In one embodiment, the second receiver 1101 receives a first-type target signal on at least one time-frequency resource block in a target time-frequency resource group; any time-frequency resource block in the target time-frequency resource group is a time-frequency resource block in N resource sets; the N resource sets comprise X resource sets; any of the X resource sets comprises at least one time-frequency resource block in the target time-frequency resource group.

In one embodiment, the N second-type signalings respectively indicate N first-type thresholds, and the N first-type thresholds are respectively used by the second node to determine the N resource sets.

In one embodiment, the second node 1100 is a UE.

In one embodiment, the second node 1100 is a relay node.

In one embodiment, the second node 1100 is a base station.

The person of ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts and other wireless communication devices. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts and other wireless communication devices. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:
1. A first node for wireless communications, comprising:
a first receiver, determining a target time-frequency resource group based on a target resource selection scheme in N resource pools, the target time-frequency resource group comprising at least one time-frequency resource block, N being a positive integer greater than 1, the target resource selection scheme being one of a first resource selection scheme or a second resource selection scheme, each of the N resource pools being a first-type resource pool, or, each of the N resource pools being a second-type resource pool; and
a first transmitter, transmitting a first-type target signal on at least one time-frequency resource block in the target time-frequency resource group;
wherein each of the N resource pools comprises multiple time-frequency resource blocks; each time-frequency resource block in the target time-frequency resource group is a time-frequency resource block in the N resource pools; the target resource selection scheme is related to whether each of the N resource pools is the first-type resource pool or each of the N resource pools is the second-type resource pool; the first-type resource pool is pre-configured or is configured by a first-type signaling, and the second-type resource pool is configured by a second-type signaling; when each of the N resource pools is the first-type resource pool, the target resource selection scheme is the first resource selection scheme; when each of the N resource pools is the second-type resource pool, the target resource selection scheme is the second resource selection scheme; the first resource selection scheme comprises autonomously determining a first resource set from a first resource pool and selecting the target time-frequency resource group from the first resource set with equal probability, the first resource set belongs to the first resource pool, and the first resource pool is one of the N resource pools; the second resource selection scheme comprises selecting the target time-frequency resource group from a second resource set, the second resource set comprises at least a first resource subset, and the first resource subset is determined by a transmitter of the second-type signaling.

2. The first node according to claim 1, comprising:
the first receiver, receiving N second-type signalings, the N second-type signalings respectively indicating N resource sets, the N resource sets respectively belonging to the N resource pools;
wherein each of the N resource pools is the second-type resource pool, and the target resource selection scheme is the second resource selection scheme; the first resource subset comprises at least one of the N resource sets.

3. The first node according to claim 1, wherein the target time-frequency resource group is selected from the second resource set with equal probability.

4. The first node according to claim 2, wherein the target time-frequency resource group is selected from the second resource set with equal probability.

5. The first node according to 1, wherein the first resource subset comprises X resource sets in the N resource sets, X being a positive integer greater than 1 and not greater than N; any of the X resource sets comprises at least one time-frequency resource block in the target time-frequency resource group.

6. The first node according to 4, wherein the first resource subset comprises X resource sets in the N resource sets, X being a positive integer greater than 1 and not greater than N; any of the X resource sets comprises at least one time-frequency resource block in the target time-frequency resource group.

7. The first node according to claim 5, wherein a first resource selection window comprises time-domain resources occupied by the target time-frequency resource group; the first resource selection window is used to determine X.

8. The first node according to claim 6, wherein a first resource selection window comprises time-domain resources occupied by the target time-frequency resource group; the first resource selection window is used to determine X.

9. The first node according to 5, wherein the N second-type signalings comprise X second-type signalings, and the X second-type signalings are used to determine the X resource sets out of the N resource sets.

10. The first node according to 8, wherein the N second-type signalings comprise X second-type signalings, and the X second-type signalings are used to determine the X resource sets out of the N resource sets.

11. A second node for wireless communications, comprising:
a second receiver, respectively executing monitorings on N time-frequency resource groups in N resource pools, N being a positive integer greater than 1; and
a second transmitter, respectively transmitting N second-type signalings in N resource pools, the N second-type signalings respectively indicating N resource sets and N first-type thresholds, the N resource sets respectively belonging to the N resource pools;
wherein each of the N resource pools comprises multiple time-frequency resource blocks;
the N time-frequency resource groups respectively belong to the N resource pools; each of the N time-frequency resource groups comprises multiple time-frequency resource blocks; and the monitorings performed on the N time-frequency resource groups and the N first-type thresholds are respectively used by the second node to determine the N resource sets by itself.

12. The second node according to claim 11, comprising:
the second receiver, receiving a first-type target signal on at least one time-frequency resource block in a target time-frequency resource group;
wherein any time-frequency resource block in the target time-frequency resource group is a time-frequency resource block in N resource sets; the N resource sets comprise X resource sets; any of the X resource sets comprises at least one time-frequency resource block in the target time-frequency resource group.

13. A method in a first node for wireless communications, comprising:
determining a target time-frequency resource group based on a target resource selection scheme in N resource pools, the target time-frequency resource group comprising at least one time-frequency resource block, N being a positive integer greater than 1, the target resource selection scheme being one of a first resource selection scheme or a second resource selection scheme, each of the N resource pools being a first-type resource pool, or, each of the N resource pools being a second-type resource pool; and
transmitting a first-type target signal on at least one time-frequency resource block in the target time-frequency resource group;
wherein each of the N resource pools comprises multiple time-frequency resource blocks; each time-frequency resource block in the target time-frequency resource group is a time-frequency resource block in the N resource pools; the target resource selection scheme is related to whether each of the N resource pools is the first-type resource pool or each of the N resource pools is the second-type resource pool; the first-type resource pool is pre-configured or is configured by a first-type signaling, and the second-type resource pool is configured by a second-type signaling; when each of the N resource pools is the first-type resource pool, the target resource selection scheme is the first resource selection scheme; when each of the N resource pools is the second-type resource pool, the target resource selection scheme is the second resource selection scheme; the first resource selection scheme comprises self-determining a first resource set from a first resource pool and selecting the target time-frequency resource group from the first resource set with equal probability, the first resource set belongs to the first resource pool, and the first resource pool is one of the N resource pools; the second resource selection scheme comprises selecting the target time-frequency resource group from a second resource set, the second resource set comprises at least a first resource subset, and the first resource subset is determined by a transmitter of the second-type signaling.

14. The method according to claim 13, comprising:
receiving N second-type signalings, the N second-type signalings respectively indicating N resource sets, the N resource sets respectively belonging to the N resource pools;
wherein each of the N resource pools is the second-type resource pool, and the target resource selection scheme is the second resource selection scheme; the first resource subset comprises at least one of the N resource sets.

15. The method according to claim 13, wherein the target time-frequency resource group is selected from the second resource set with equal probability.

16. The method according to claim 14, wherein the target time-frequency resource group is selected from the second resource set with equal probability.

17. A method in a second node for wireless communications, comprising:
- respectively executing monitorings on N time-frequency resource groups in N resource pools, N being a positive integer greater than 1;
- respectively transmitting N second-type signalings in N resource pools, the N second-type signalings respectively indicating N resource sets and N first-type thresholds, the N resource sets respectively belonging to the N resource pools;
- wherein each of the N resource pools comprises multiple time-frequency resource blocks; the N time-frequency resource groups respectively belong to the N resource pools; each of the N time-frequency resource groups comprises multiple time-frequency resource blocks; the monitorings performed on the N time-frequency resource groups and the N first-type thresholds are respectively used by the second node to determine the N resource sets by itself.

18. The method according to claim 17, comprising:
- receiving a first-type target signal on at least one time-frequency resource block in a target time-frequency resource group;
- wherein any time-frequency resource block in the target time-frequency resource group is a time-frequency resource block in N resource sets; the N resource sets comprise X resource sets;
- any of the X resource sets comprises at least one time-frequency resource block in the target time-frequency resource group.

\* \* \* \* \*